(12) United States Patent
Roberts

(10) Patent No.: US 12,305,605 B2
(45) Date of Patent: May 20, 2025

(54) POWER GENERATION AND/OR STORAGE APPARATUS

(71) Applicant: VERDERG LIMITED, Woking Surry (GB)

(72) Inventor: Peter Roberts, Woking (GB)

(73) Assignee: Verderg Limited, Woking Surrey (GB)

( * ) Notice: Subject to any disclaimer, the term of this patent is extended or adjusted under 35 U.S.C. 154(b) by 0 days.

(21) Appl. No.: 18/275,043

(22) PCT Filed: Jan. 31, 2022

(86) PCT No.: PCT/GB2022/050249
§ 371 (c)(1),
(2) Date: Jul. 31, 2023

(87) PCT Pub. No.: WO2022/162394
PCT Pub. Date: Aug. 4, 2022

(65) Prior Publication Data
US 2024/0102441 A1  Mar. 28, 2024

(30) Foreign Application Priority Data

Feb. 1, 2021 (GB) ...................................... 2101376

(51) Int. Cl.
*F03B 13/10* (2006.01)
*F03B 17/06* (2006.01)
(Continued)

(52) U.S. Cl.
CPC ............ *F03B 13/10* (2013.01); *F03B 17/062* (2013.01); *F03D 9/11* (2016.05); *F03B 13/264* (2013.01);
(Continued)

(58) Field of Classification Search
CPC ...... F03B 13/10; F03B 17/062; F03B 13/264; F03D 9/11; F03D 9/43; F05B 2260/421; F05B 2270/321
See application file for complete search history.

(56) References Cited

U.S. PATENT DOCUMENTS

| 6,327,994 B1 | 12/2001 | Labrador |
| 2012/0003077 A1 | 1/2012 | Churchill |

(Continued)

FOREIGN PATENT DOCUMENTS

| CN | 108700044 A | 10/2018 |
| DE | 19819929 | 11/1999 |

(Continued)

OTHER PUBLICATIONS

PCT Search Report for PCT/GB2022/050249, Mar. 15, 2022.
UK IP Office Combined Search and Examination Report, App. GB2101376.8, Jun. 16, 2021.

*Primary Examiner* — Viet P Nguyen
(74) *Attorney, Agent, or Firm* — Woods Rogers PLC; Timothy Bechen; Nathan Evans

(57) ABSTRACT

A power generation and/or storage apparatus comprising a buoyant flywheel, wherein the flywheel is arranged, in use, in contact with a body of liquid for rotation about a substantially vertical axis, an underside of the flywheel comprising a circumferentially extending opening, wherein, in use, gas is trapped within the opening by the surface of the liquid to define an gas cushion for supporting the flywheel.

18 Claims, 24 Drawing Sheets

(51) Int. Cl.
 *F03D 9/11* (2016.01)
 *F03B 13/26* (2006.01)
 *F03D 9/43* (2016.01)

(52) U.S. Cl.
 CPC .......... *F03D 9/43* (2016.05); *F05B 2260/421* (2013.01); *F05B 2270/321* (2013.01)

(56) References Cited

U.S. PATENT DOCUMENTS

| | | |
|---|---|---|
| 2012/0114486 A1 | 5/2012 | Ehrnberg |
| 2015/0048619 A1 | 2/2015 | Lin et al. |
| 2016/0123331 A1 | 5/2016 | Nix |
| 2017/0250626 A1 | 8/2017 | Barlot |
| 2019/0032643 A1 | 1/2019 | Novak |
| 2019/0211797 A1* | 7/2019 | Viselli .................... F03B 13/16 |
| 2019/0353139 A1* | 11/2019 | Sheldon-Coulson ... F03B 13/24 |
| 2020/0056578 A1* | 2/2020 | Sheldon-Coulson ... B63B 1/048 |

FOREIGN PATENT DOCUMENTS

| | | |
|---|---|---|
| DE | 19819929 A1 | 11/1999 |
| DE | 10 2016 125024 | 8/2018 |
| WO | WO-2016185189 A1 * | 11/2016 ............ F03B 13/142 |

\* cited by examiner

POWER GENERATION AND/OR STORAGE APPARATUS

The present application is the National-stage filing of and relies on the disclosures of and claims priority to and the benefit of PCT Patent Application PCT/GB2022/050249 filed Jan. 31, 2021 with an original priority date of Feb. 1, 2020 based on GB Patent App. 2101376.8, the disclosures of which are hereby incorporated by reference herein in their entireties.

DESCRIPTION OF INVENTION

The present invention relates to a power generation and/or storage apparatus. In particular to such a system that utilises a buoyant flywheel.

BACKGROUND OF THE INVENTION

There is a well-publicised and long running initiative around the globe to move away from fossil fuels for electricity production and towards greener alternatives. Renewable energy sources, such as wind and solar, have clear potential to reduce dependence on fossil fuels. Among other factors, climate change concerns are resulting in ever increasing deployments of both technologies. Both solar photovoltaics and wind energy have intermittent output. The variability of these sources gives rise to understandable concerns regarding the reliability of an electric grid that derives a large fraction of its energy from these sources. It is widely understood that energy storage will form an essential part of energy systems moving forward, particularly as reliance on renewable energy sources grows.

Several methods of electrical energy storage exist, including pumped hydroelectric energy storage, batteries, compressed air energy storage and flywheels.

The present invention arose as a result of work relating to the provision of an improved energy generation and/or storage apparatus.

SUMMARY OF THE INVENTION

In one aspect, the present invention provides a power generation and/or storage apparatus comprising a buoyant flywheel, wherein the flywheel is arranged, in use, in contact with a body of liquid for rotation about a substantially vertical axis, the underside of the flywheel comprising a substantially circumferentially extending opening, wherein, in use, gas is trapped within the opening by the surface of the liquid to define a gas cushion for supporting the flywheel.

By such arrangement, the flywheel is arranged, in use, to float on the surface of a cushion of gas. Contact of the flywheel with the body of liquid provides a fluid seal for the gas cushion. The body of liquid may be open water, such as a sea or a lake, or may comprise a suitable trough, or otherwise. The opening may face the body of liquid, such that the gas cushion is supported by the surface of the body of liquid, it may otherwise face a support surface other than the body of the liquid, such that the gas cushion is supported by the support surface. In further arrangements, it may face both the body of water and the support surface other than the body of water. Regardless of the configuration, the flywheel is stabilized in pitch and roll by its contact with the body of liquid. The contact with the body of liquid is preferably through one or more circumferential dependent walls, wherein the stabilisation occurs by displacement of one or more circumferential dependent walls into the body of liquid.

The gas is most preferably air. The liquid is most preferably water. The opening preferably extends substantially continuously around the entire circumference of the flywheel.

According to this arrangement, the flywheel is supported on one or more gas cushions, most preferably air cushions. The gas cushion(s) act to reduce frictional forces. Moreover, in the case of open water installations, any wave induced motions are effectively reduced. The volume of the gas cushion(s) and the draft of the flywheel may be preserved or restored by introducing more gas. This may be achieved using air compressors.

Whilst, as stated, the gas is not to be limited to air, the description that follows will focus on the provision of an air cushion for simplicity. It must, however, be appreciated that any of the described arrangements could be suitably modified, as will be readily appreciated by those skilled in the art, to use gas other than air.

Embodiments provide a large floating horizontal flywheel which stores mechanical energy by rotating about its vertical axis. It may function to store self-generated wind energy and/or to store converted electrical energy, which is imported from elsewhere, as rotational mechanical energy. Such mechanical energy can subsequently be reconverted to electrical energy as needed and delivered by cable to end users. Alternatively, this electricity can be used for other purposes. For example, it may be used on or adjacent the apparatus to produce hydrogen by electrolysis which can then be exported by pipeline to end users, together with the co-produced oxygen in a separate pipeline if required.

For self-generating wind energy, the flywheel may be provided with a plurality of sails attached thereto.

An embodiment which comprises a very large flywheel has the potential to store, generate and export energy on a Gigawatt scale.

According to one or more embodiments, the apparatus can be sited offshore, in open water, moored to the sea bed. In alternative embodiments it may float in a circular trough of water onshore, or otherwise.

In preferred arrangements, for installation in open water, the overall dimensions of the flywheel may be sufficiently large compared to the incident wavelengths that pitch and roll motions of the flywheel are substantially decoupled from the incident waves and remain minimal. The characteristic minimum overall dimension to achieve this decoupling may, for example, be around 1500 metres in open water where a typical wave spectrum prevails.

Substantial gyroscopic stabilization is a feature of various embodiments that is also beneficial to performance.

The flywheel may be substantially toroidal. The flywheel may comprise a cover, which is air-tight and closes off the centre of the toroid. The cover may comprise a disc, which may be cellular, or may comprise a frame closed by a skin, which may comprise steel, concrete, glass reinforced plastic or airtight fabric. The cover may close off the opening.

The flywheel, whatever its form, may comprise a pair of spaced circumferential walls that depend, in use, from the flywheel, wherein the opening is provided between the walls. One of the circumferential walls may be a peripheral wall or both walls may be spaced radially inwardly of the periphery of the flywheel. The flywheel may alternatively comprise a single circumferential wall that depends, in use, from the flywheel, wherein the opening is provided by the circumferential wall. The circumferential wall may be provided at the periphery of the flywheel or may be spaced radially inwardly of the periphery of the flywheel. The circumferential wall(s) preferably depend substantially vertically in use. The circumferential wall(s) preferably penetrate the surface of the liquid in use. Such penetration will provide submerged surfaces that support the flywheel on the surface of the liquid. As mentioned, there may be stabilization in pitch and roll by the displacement of the circumferential wall(s) into the body of liquid.

Skin friction between the rotating submerged surfaces with the surrounding water in such embodiments offshore will create a circulating Gyre. This may further provide an accessible further energy storage capacity and will serve to reduce the skin friction as a result of the reduction in relative velocity between the rotating submerged surfaces and the water.

The apparatus according to various embodiments will be semi-transparent to waves because much of the energy of an incident wave will propagate under the wall(s) and through a lowered water surface defining the underside of the air cushion, then under the subsequent wall(s) back out into open water, thereby reducing incident wave forces. When a wave passes underneath the flywheel in this manner, air displaced by the crest of the wave in the air cushion simply moves into the trough of the wave with effectively zero change in air pressure on the structure. This can be characterized by the observation that the flywheel behaves hydrostatically and hydrodynamically as if it were a semisubmersible supported by an air cushion but stabilized by its surface-piercing elements/wall(s), thus decoupling buoyancy and stability.

The presence of the air cushion and minimal bending moments generated by the buoyancy of the surface-piercing elements, which act as supports, permits a relatively lightweight construction to be adopted.

The flywheel may be fabricated from any suitable material such as, without exclusion of other materials, steel or concrete. Preferred embodiments are fabricated from post-tensioned concrete.

The flywheel may feature a compartmentalized/cellular construction whereby the compartments/cells can be ballasted with water. Ballasting the cells may increase the polar second moment of inertia of the flywheel and thereby increase its energy storage capacity for any given angular velocity.

Water in the ballasted cells may be under considerable centrifugal pressure, wherein it may be released tangentially to regenerate electrical energy.

Enhanced damage stability can be achieved in some embodiments by leaving an appropriate number of cells unflooded and/or by installation of circumferential compartmentalization of the air cushion.

The fluid seal may comprise a segmented labyrinth. The labyrinth may be formed by multiple interlocking cells, each of which is formed by a dependent wall, depending from the flywheel 1, and a facing wall, projecting in opposition to the dependent wall.

According to one or more embodiments, electrical energy imported from elsewhere may be reversibly converted by stationary facilities into rotational mechanical energy for storage by the flywheel at the interface between the stationary facilities and the flywheel which is thereby induced to rotate.

According to one or more embodiments, electrical energy imported from elsewhere may be conducted onto the flywheel and reversibly converted there by facilities carried on the flywheel into rotational mechanical energy for storage by the flywheel which is thereby induced to rotate.

According to one or more embodiments, facilities mounted on the flywheel may convert wind energy directly into rotational mechanical energy for storage by the flywheel which is thereby induced to rotate.

According to one or more embodiments, facilities mounted on the flywheel may reversibly convert rotational hydrodynamic energy from surrounding water directly into rotational mechanical energy for storage by the flywheel which is thereby induced to rotate.

Further, preferable, features are presented in the dependent claims.

BRIEF DESCRIPTION OF THE DRAWINGS

Embodiments of the present invention will now be described, by way of non-limiting examples only, with reference to the Figures in which.

DETAILED DESCRIPTION

Generally, embodiments of the present invention provide an apparatus for power generation and/or storage, which comprises a novel buoyant flywheel.

It is to be noted that whilst clockwise rotation of the flywheel is assumed throughout this document, anti-clockwise rotation is also acceptable, as will be readily appreciated by those skilled in the art.

Figure 1:
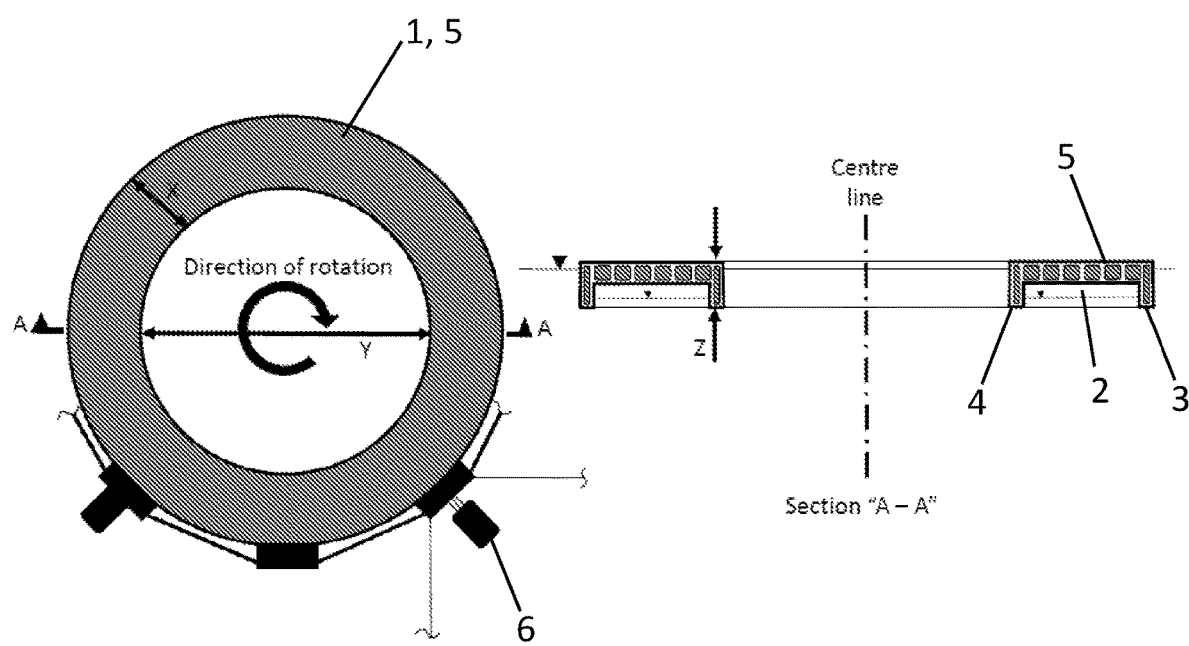
FIG. 1 illustrates an energy storage apparatus according to a first arrangement in plan and sectional elevations.

FIG. 1 shows a power generation and/or storage apparatus according to a first embodiment. The apparatus comprises a toroidal flywheel 1.

The flywheel 1 is buoyant and is arranged, in use, in contact with the surface of a body of liquid with an underside of the flywheel facing the surface of the liquid. The flywheel is arranged for rotation about a substantially vertical axis. The underside comprises a circumferentially extending opening 2. In use, gas is trapped within the opening by the surface of the liquid. There is thereby provided a gas cushion that acts to provide support to the flywheel 1 and, as discussed, provides for significantly reduced rotational friction.

In the present arrangement, as is preferred, the circumferential opening extends substantially continuously around the entire circumference of the flywheel 1. It may otherwise comprise a plurality of separate sections, as discussed further below.

In the present arrangement, the flywheel comprises a pair of spaced circumferential walls 3, 4 that depend, in use, from the flywheel 1, wherein the opening is provided between the walls, as clearly seen in the sectional view A-A. In the present arrangement, a deck 5 extends between the walls and closes off an upperside of the opening 2. The deck is closed to trap gas within the opening.

The walls preferably depend vertically in use, as shown. The walls 3, 4 penetrate the surface of the liquid in use, wherein the walls 3, 4 thereby define support surfaces for the flywheel 1.

By such arrangement, the flywheel is arranged, in use, to float on the surface of a cushion of gas trapped within opening 2. Contact of the flywheel with the body of liquid, through the walls 3, 4 provides a seal for the gas cushion. The flywheel 1 is stabilized in pitch and roll by its contact with the body of liquid by displacement of the walls 3, 4 into the body of liquid. The opening 2 faces the body of liquid. In onshore arrangements, such as those discussed below, for example, with respect to FIGS. 11 and 24. The opening 2 may rather face a solid support surface, such as the earth or a platform.

The flywheel 1 of the present arrangement has a depth Z, deck width X and internal diameter Y. As will be appreciated by those skilled in the art, increasing any of these dimensions will increase the Polar Second Moment of Inertia of the flywheel 1 and thereby increase its energy storage capacity at any given angular velocity.

With reference to FIG. 1, some exemplary and non-limiting external electrical energy import and export facilities 6 are shown. It is to be noted that the embodiment of FIG. 1 is not to be limited to the presence or form of these facilities as discussed in the following paragraphs, various alternative arrangements may be implemented, as will be appreciated by those skilled in the art.

A typical energy generation module will remain static in global coordinates as the flywheel rotates. Relative motion between the energy generation module and the flywheel will be used to generate electricity or increase rotational mechanical energy by any suitable conventional means, such as, but not limited to, wheeled bogeys linked to electrical generators/motors carried on the inner surface of the energy generation module and bearing onto the flywheel outer surface. Alternatively, a row of exciter coils or permanent magnets around the flywheel circumference opposed by generation or powered coils on the inner surface of the energy generation module can form a generator or motor, as the context demands. A further preferred alternative is a toroidal magnetic levitation track that serves the dual purpose of converting imported electrical energy to be stored as rotational mechanical energy and vice versa, in addition to taking some portion or all of the overall weight supported on the air cushion resulting in a reduced depth of air cushion, reduced dependent wall dimensions and reduced frictional losses. Numerous suitable arrangements will be readily conceived by those skilled in the art and the present invention is not to be limited in this regard.

The energy generation modules can, for example, be supported by rails or ledges around the outer circumference of the flywheel on suitable wheeled bogeys or bearings to permit free relative circumferential movement, and freedom for the flywheel to move vertically carrying with it the energy generation modules.

Alternatively, where electrical power is generated on board the flywheel for export, or imported onto the flywheel for conversion on board the flywheel into rotational mechanical energy, energy generation modules can simply carry slip-ring, pantograph or other conventional apparatus to transmit electricity onto or from the flywheel, as may be required and as will be readily appreciated by those skilled in the art.

Selected energy generation modules may, in some exemplary arrangements, also carry the upper end of mooring legs formed from cables and/or chains in the conventional manner of offshore floating structures. In such case, there may be three or more mooring leg pairs provided circumferentially to hold the flywheel on station and retain associated energy generation modules in global position whilst permitting free vertical movement of the flywheel over a desired vertical range.

In alternative arrangements, energy generation modules or integrated modules may not need to carry mooring leg pairs. They may, for example, be retained in global position by suitable module connectors, as will be readily appreciated by those skilled in the art.

An integrated module, such as that shown in FIG. 1 is preferably a multi-process module comprising an energy generation module and also power management facility. It may comprise additional facilities, including but not limited to electrolysis facilities for example to generate hydrogen and oxygen. It may yet further, for example, provide accommodation facilities.

It is to be noted that in some arrangements, the integrated module may be sited on a fixed structure adjacent the flywheel in which case the energy generation module will be separately mounted on the flywheel and the electrical energy generated thereby will be transmitted to the integrated module. It may, for example be transmitted by one or more catenary cables, or otherwise. In the case of catenary cables, these may first be suspended from module connectors before reaching their target integrated module at a nearby circumferential location.

Figure 2:
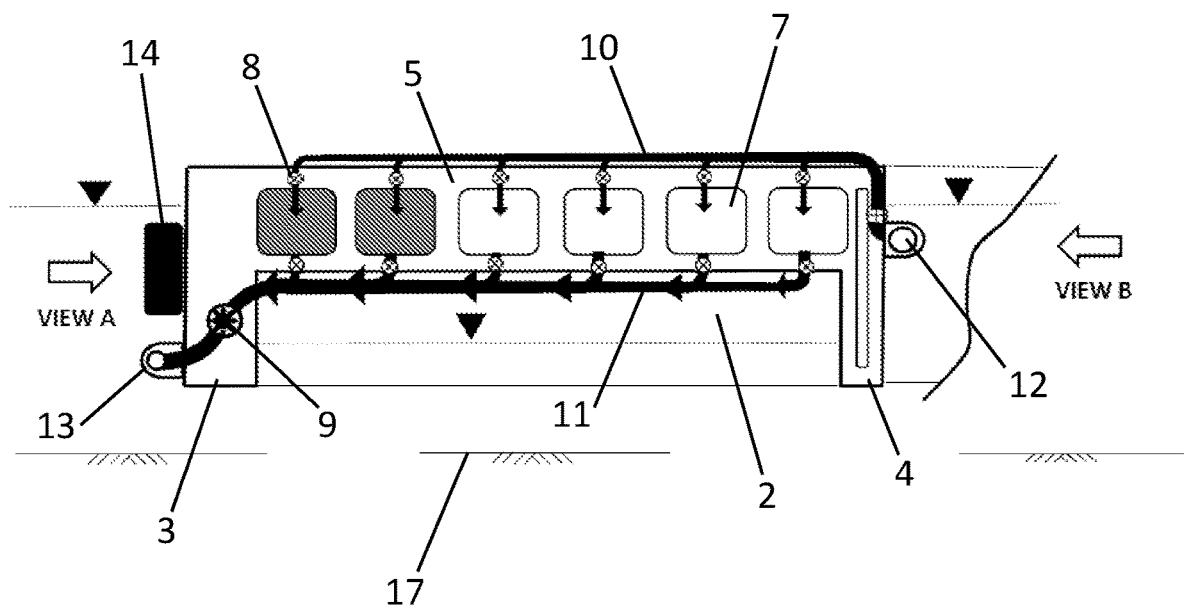
FIG. 2 shows an enlarged partial sectional view of a flywheel of the apparatus of FIG. 1, taken through the line A-A in FIG. 1.

FIG. 2 shows an exemplary but preferred configuration of the flywheel. The deck width X, is shown in enlarged partial section, taken through line A-A of FIG. 1.

As discussed above, opening 2 is provided to allow for the provision of an air cushion, which acts to support the flywheel. When used in open water, the air cushion will decouple the pitch and roll response of the flywheel from the incident waves which propagate under and past the flywheel with only partial attenuation to further mitigate incident wave forces.

As mentioned above, it is preferable that the flywheel has a cellular structure. By provision of a cellular structure the material volume (and cost) may be reduced, whilst also allowing for the mass to be varied by ballasting. It is to be noted that any of the walls or deck may be ballasted in any combination that preserves the circumferentially uniform mass distribution of the flywheel.

The energy storage capacity of the flywheel 1 may be enhanced by increasing its mass and thereby its Polar Second Moment of Inertia. With a cellular structure, its mass may be increased by ballasting the cells 7 with water. This provides an economical solution for varying the flywheel's mass and thereby managing its energy storage capacity and the angular velocity of its rotation as required.

It is preferable (although not essential), as in the present arrangement, that each cell is bounded by both radial and circumferential walls, so as to minimize the Free Surface Effect of any part-full cell on the hydrostatic stability of the overall flywheel. In preferred operational practice, a majority of ballasted cells will be pressed full to minimize free surface effects.

Notably, a uniform air pressure under the entire flywheel structure, as may be achieved, will serve to reduce the bending moments formed in the cross-section shown in FIG. 2, permitting a very economical thin-walled design to be adopted in the deck structure.

A ballast system may be provided to allow for the selective ballasting of the cells, as desired. The ballast system comprises a plurality of valves 8 and preferably further comprises a pump 9. The ballast system allows for the controlled introduction and evacuation of water from the cells 7.

FIG. 2, for illustrative purposes, shows a configuration with both (shaded) ballasted cells and dry cells.

In the present, exemplary arrangement, the cells 7 are fed by an inlet manifold and drained by an exhaust manifold 11, controlled by the valves 8, which are preferably remotely actuated. The present invention need not be limited to such an exemplary arrangement. Alternative arrangements could, for example, omit the manifolds. There is provided an inlet 12 and an outlet 13, which, in the present arrangement comprising the manifolds 10, 11, are connected to the inlet manifold 10 and outlet manifold 11, respectively. The inlet 12 and outlet 13 are preferably oriented such that both ballasting and de-ballasting are assisted by the rotation of the flywheel. It is possible that a ballasted system may be implemented in this manner without use of a pump 9. However, one or more pumps are preferably provided, as shown.

A pump will usefully assist ballasting, in particular when the inlet manifold is at a level above the inlet in use or where the flywheel is rotating insufficiently quickly to prime the system automatically.

The introduction of one or more pumps further allows for increased utility, in certain exemplary arrangements, particularly when the pump is configured to act as both a pump and a turbine.

In preferred arrangements where imported electrical energy is converted into mechanical energy in an Energy Generation Module, by use as exemplified earlier by motorized bogeys or where the outer periphery of the flywheel acts as the rotor of an electrical motor/generator with the Energy Generation Module forming the stator, the rotational mechanical energy thus converted is added directly to the flywheel at this interface, increasing its angular velocity. Alternatively, where maintaining a constant angular velocity is desired, typically to maintain the target tangential velocity at its set point, for example, additional ballast may be taken on board to increase the angular moment of inertia of the flywheel by a corresponding amount. The converse applies when re-generating electrical energy from stored rotational mechanical energy.

Where electrical energy is converted on the flywheel from rotational kinetic energy stored by the flywheel, another preferred option is to permit flow from ballasted cells 7 through valves 8 into the exhaust manifold 11 under centrifugal pressure and then through the pump 9 acting as a turbine, or through one or more separate turbines, to generate electrical energy.

Conversely, where electrical energy from an external source, for example a windfarm or otherwise, is imported to the flywheel 1 to be converted on the flywheel 1 from electrical energy into rotational kinetic energy stored by the flywheel 1, one preferred option for this conversion is for the imported electrical energy to power the pump 9 acting as a jet pump to exhaust high energy water through the outlet creating a tangential force on the flywheel 1 that increases its angular velocity and thereby the amount of rotational kinetic energy stored. The water thus ejected from outlet may be drawn from ballasted cells 7 through the valves 8 into the exhaust manifold 11 thereby additionally reducing the Polar second Moment of Inertia helping accelerate the rate at which the Tangential velocity increases towards a target value.

Alternatively, the water ejected from the outlet 13 may be drawn under centrifugal pressure through the exhaust manifold 11 direct from the inlet 12 through a section of the manifold cross-connected to the exhaust manifold (not shown) and then through the pump 9 acting as a pump driven turbine by the imported electrical energy to increase tangential velocity and be stored as rotational mechanical energy.

It is to be noted that the above arrangements may be effected using a separate pump and turbine, which may be mounted in suitable manifolds to permit one or the other to be in function.

Whilst flywheels in accordance with the principals discussed herein will exhibit relatively flat performance curves, indicating that "round-trip" energy storage and recovery efficiency will be somewhat tolerant of the actual angular rotation velocity, it is expected that in any specific design there will be a target tangential velocity and corresponding angular rotation velocity. By the provision of a ballasted arrangement, in accordance with the exemplary arrangements described above, or otherwise, the flywheel will provide the ability firstly to take on ballast when accepting electrical energy for conversion and storage as rotational kinetic energy and secondly to discharge ballast in the converse context of generating electrical energy from its rotational kinetic energy. This allows for the total mass of the flywheel to be varied such that its polar second moment of inertia varies to compensate for the changing quantum of stored energy, and a constant tangential velocity may be preserved, maintaining peak operational efficiency and further usefully flattening the performance curve.

Figure 3:
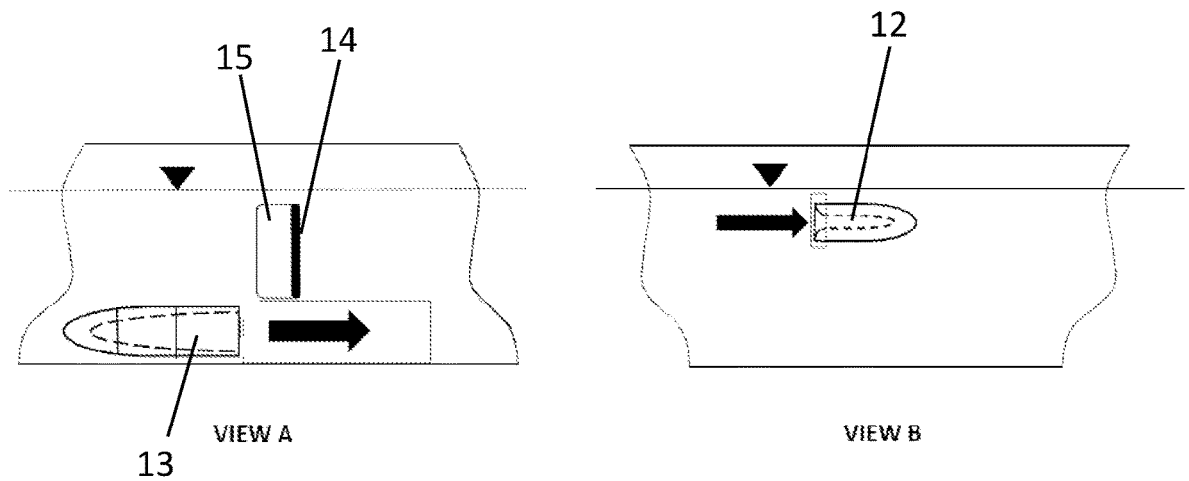
FIG. 3 shows views A and B as detailed in FIG. 2.

The flywheel 1 may optionally be provided with drag members 14, as shown by way of example in FIG. 2. The form of the drag members 14 need not be particularly limited. The drag members 14 may comprise plates. The use of drag members is of particular interest when the flywheel is to be located in open water. Such drag members 14 may be installed at regular points around the outer circumference of the flywheel 1. They are preferably retractably mounted, wherein they can be opened as required or stowed flush with the outer circumference of the flywheel 1 when not used. They may be pivotably mounted for such purposes. Numerous suitable mounting arrangements will be readily appreciated by those skilled in the art. FIG. 3, in view A, shows a side elevation of an example drag plate 14 fully deployed and also shows a recess into which it may be stowed.

As discussed, one function of the air cushion is to limit the skin friction between the flywheel 1 and the water by minimizing the wetted area. Some friction will remain which serves to reduce tangential velocity and circulate the nearby water by dragging it around with the wetted surfaces to some extent. By the provision of the drag members 14, some of the kinetic energy of this circulating water may be recovered. The velocity profile of the circulating water will reduce at increasing radius away from the flywheel but its effective size in plan will continue to grow radially outwards over time as its energy builds up, forming a Gyre around the flywheel. Such Gyres are very efficient rotational kinetic energy stores which naturally decay quite slowly.

Also note that as the Gyre absorbs energy from the flywheel 1 and grows in size, the tangential velocity of the Gyre near the interface with the outer wetted surface of the flywheel 1 grows also, reducing the relative velocity between Gyre and the flywheel 1 and reducing the shear force between them, thereby self-limiting the energy loss into the Gyre.

In such context, the drag members 14 may serve two functions:

Firstly, if it becomes necessary to stop the flywheel 1 as quickly as possible, for some unplanned maintenance for example, or otherwise, the stored energy has to be dissipated. If this is beyond the capacity of the electrical generation system to convert to electrical energy or beyond the transmission or consumption capacity of the energy export facilities, the drag members 14 may be deployed such that increased drag forces are experienced, slowing down the rotational velocity. Such drag forces will create turbulence in way of the drag members 14 in which energy is lost forever as heat. However, the drag forces will also enhance the size and kinetic energy of the Gyre in which some of the lost energy will be stored.

Secondly, when the stored energy has been significantly depleted by a long period of demand with little or no replenishment, the situation may arise when the surrounding Gyre is rotating faster than the flywheel 1. Under these circumstances, some of the flywheel's stored energy may be usefully recovered by deploying the drag members 14 to increase tangential drag forces of the Gyre on the flywheel 1, i.e. the reverse process to that above.

FIG. 3 shows side elevations of the inlet 12 and outlet 13, as discussed above with particular reference to FIG. 2. In the depicted exemplary arrangement, the inlet 12 is provided with bell-mouth entry, which is configured to smooth incoming flow. The inlet may be otherwise configured, as will be readily appreciated by those skilled in the art. Both the inlet 12 and the outlet 13 are preferably housed in smoothed nacelles, as shown, so as to minimize drag. In some arrangements, these nacelles may be retractable, wherein their retraction will leave a smooth circumferential surface to the flywheel to further limit drag forces when they are not in use.

The apparatus is preferably configured such that the velocity of the ejected flow through the outlet 13 may be varied. In some exemplary arrangements, the outlet 13 can optionally be segmented into two or more retractable sections of gradually increasing internal diameter forming a draft tube to decelerate the flow emerging from the outlet without undue turbulent flow losses. FIG. 3 shows an example with three such sections. In alternative arrangements this need not be the case. In particular, there may be alternative means implemented for controlling the velocity of ejected water.

As discussed above, flywheels in accordance with the principals of the present invention will generally be designed to operate at or around an optimal performance point including an optimized tangential velocity $V_T$. In such case, the exhaust velocity of the flow from the outlet 13 relative to the flywheel 1 may be configured such that it has a near zero velocity relative to the adjacent water into which it is ejected. Such an arrangement will act to minimise turbulent losses. However, when the flywheel 1 is operating away from its optimal design point, it may be desirable to accelerate the rotational angular velocity of the flywheel 1 to reduce or eliminate the velocity mismatch between ejected flow and the water in the Gyre into which it should be able to mix without undue losses.

Velocity control using the exemplary arrangement of FIG. 3 will now be considered in more detail.

A relatively high relative velocity may be appropriate between ejected water from the outlet 13 and the surrounding water when the flywheel has reached its full design value of tangential velocity $V_T$. In such case, only the first upstream section of the nacelle may be deployed, and the exit diameter of the outlet will be the smallest available.

At start-up when the flywheel is still rotating slowly, the velocity mismatch between ejected water and the surrounding water is much less and it will be preferable for the ejected water to be allowed to slow more in a longer draft tube before exiting into the surrounding water to minimize energy loss. Here, for example, all three sections may be deployed (as seen in FIG. 3) to minimize turbulent losses by more closely matching the velocities of ejected water and surrounding water.

It may further be the case that only two sections would be appropriate to deploy for intermediate rotational velocities.

It should be noted, as stated above, that alternative means of velocity control for ejected water may be implemented, as will be readily appreciated by those skilled in the art with the above control alternatively effected.

FIG. 2 shows the sea bed 17. If the water is very shallow the bottom clearance will be limited and the induced Gyre may cause erosion. This can be avoided by appropriate rock dumping of the area prior to installation.

It should be noted that in any toroidal configurations of the flywheel 1, which comprise spaced circumferential depending walls 3, 4, the walls may be substantially the same as one another or may differ from one another. The walls can be considered to comprise an inner circumferential wall 4 and an outer circumferential wall 3. The inner and outer circumferential walls may both comprise cells 7 to allow them to be ballasted, one only of the inner and outer circumferential walls may comprise cells, or neither of the circumferential walls may comprise cells. The inner and outer circumferential walls may have the same thickness or may differ in thickness from one another. Different combinations of these features may be provided in exemplary arrangements.

Figure 4:
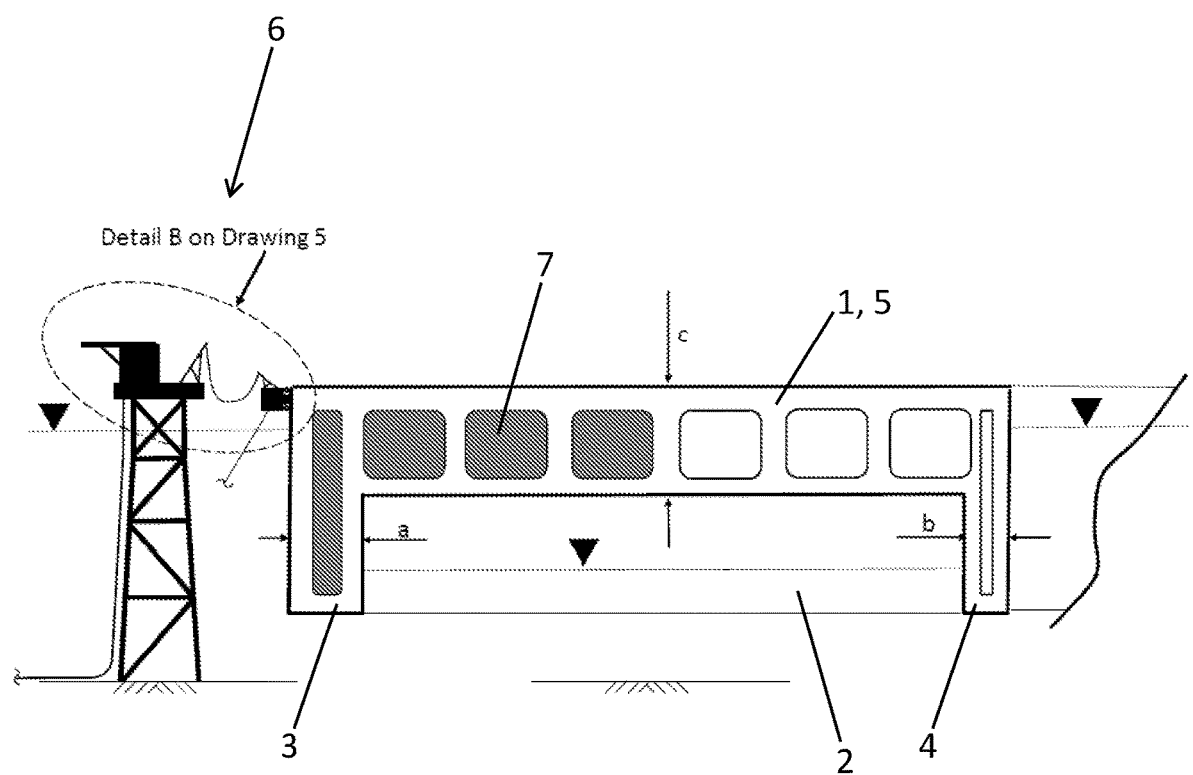
FIG. 4 shows an energy import/offtake arrangement with an enlarged partial sectional view through a flywheel.

FIG. 4 shows an exemplary arrangement in which the thickness of the outer circumferential wall 3 is greater than that of the inner circumferential wall 4. Both walls have the capacity to be ballasted, although this need not be the case, in line with the above discussion.

The outer circumferential 3 wall is made thicker for the reason that the outer circumferential wall 3 is at the greatest overall diameter of the flywheel and therefore its underwater displacement is the primary contributor to maintenance of the hydrostatic roll and pitch stability of the flywheel. The inner circumferential wall 4 is a secondary contributor to hydrostatic stability and its thickness may be chosen primarily to provide adequate structural strength where adequate hydrostatic stability is already provided more efficiently by the selected thickness of the outer circumferential wall.

As a separate consideration, again applicable to all toroidal arrangements of the flywheel, the thickness and configuration of the deck 5 may be varied. The thickness may be set to maximize its volume and hence the mass of the ballast water in the cells 7 thereof for efficiently increasing the energy storage capacity. Notably, as an advantage of the air cushion, the weight of the deck and any ballast is uniformly supported. This allows for the provision of a comparatively lightweight structure. The bending moment stresses are minimized by the uniform support of the air cushion. This allows for a reduction in the overall cost of the flywheel as compared to structures with no such uniform support.

Whilst not tied exclusively to the above features of the flywheel 1 shown in FIG. 4, the arrangement of FIG. 4 also exemplarily discloses an export system 6, which will now be discussed further. It is to be noted that such an arrangement may be incorporated into alternative apparatuses comprising alternatively configured flywheels such as those discussed elsewhere in the present application.

The export system 6 comprises an integrated module where the power management systems are sited. This may, for example, comprise a conventional cable for electricity transmission, such as but not limited to a High Voltage Direct Current cable. It may additionally comprise a pipeline, such as but not limited to a steel pipeline, for the export of hydrogen when this is optionally generated in the integrated module from electrical energy.

Such types of energy export system are appropriate as shown for export from a fixed structure onto which an electrical cable may be affixed. An electrical cable may, for example, be affixed by pulling up through a J-tube, or otherwise attached to a support or leg of the fixed structure after its installation. In the event a pipe is to be provided, pipeline riser may be installed on the fixed structure for subsequent sea bed connection to the pipeline. It may alternatively (if of small diameter) be pulled up through a J-tube.

Figure 5:
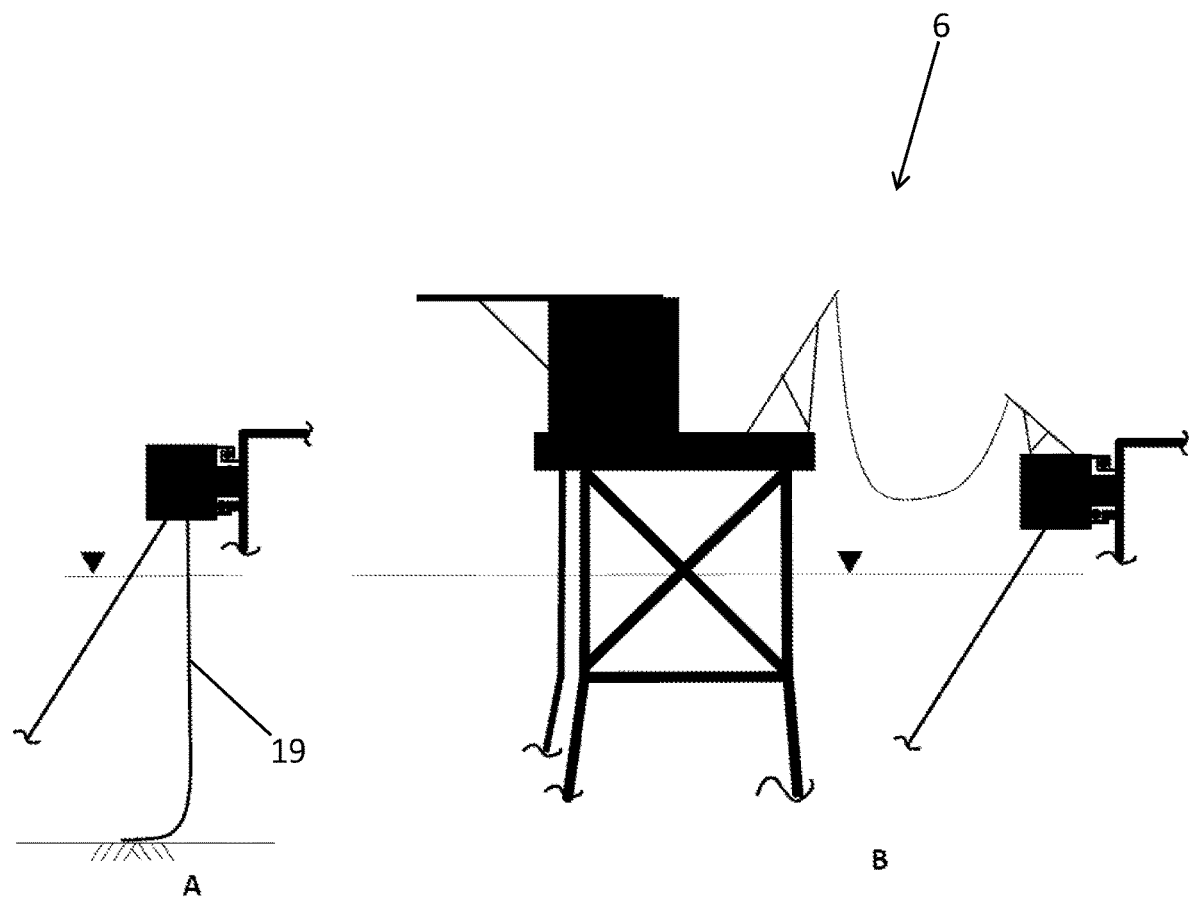
FIGS. 5 and 6 show further energy import/export arrangements.

FIG. 5A discloses an arrangement where no fixed structure is present. Such an arrangement may be implemented, for example, when the water depth is sufficient for an energy export system to be provided in the form of a flexible cable or a flexible pipeline 19, which has sufficient structural integrity to hang in a catenary from the flywheel to the sea bed.

FIG. 5B shows detail B from FIG. 4. Note that in this exemplary arrangement the integrated module 6 is provided with a helideck for access by service personnel. The provision of a helideck is entirely optional.

Figure 6:
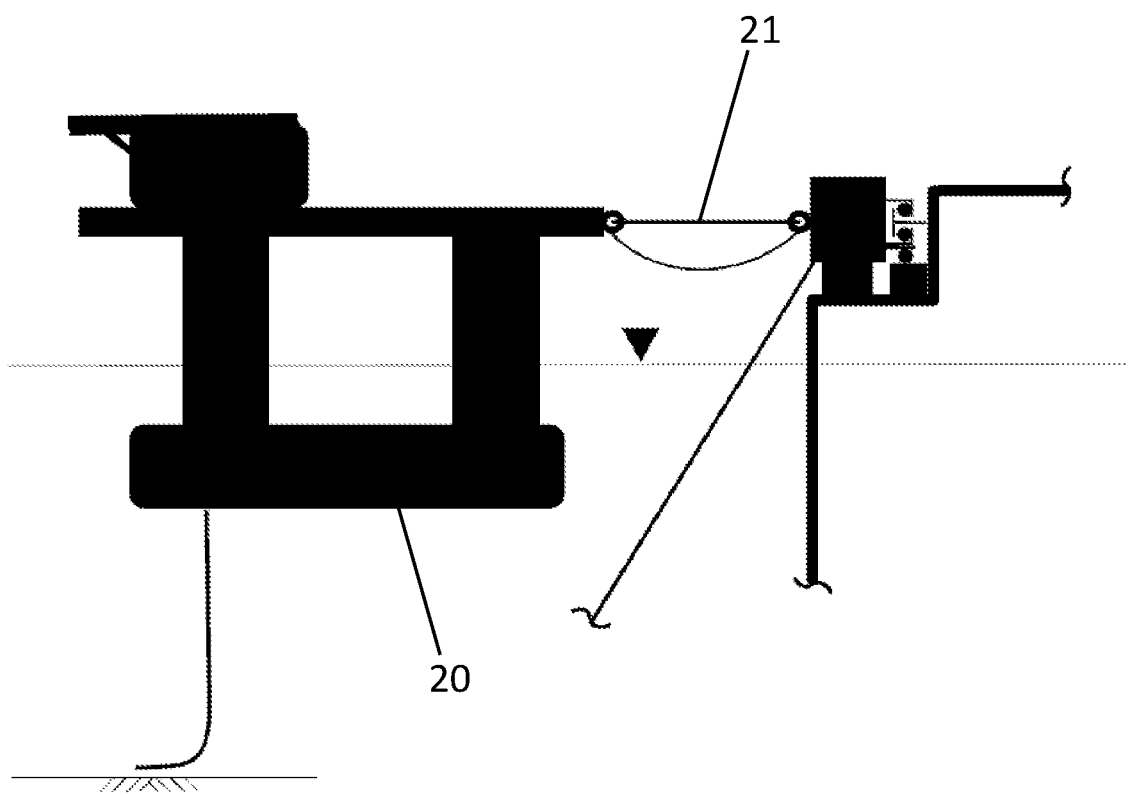

FIG. 6 discloses a further alternative in which the integrated module 6 is sited on a semi-submersible 20, which is moored to the energy generation module. Such an arrangement may be useful in deep water settings. In such an arrangement it will be preferable to provide a support means for the semisubmersible. In the exemplary depicted arrangement, there is provided an articulated tether frame 21. This is preferably configured to allow the semisubmersible freedom to pitch, roll and heave. It may additionally be arranged to provide access arrangements to the flywheel 1 by service personnel and equipment. Note that an optional horizontal configuration is also shown for the energy generation module, which may be implemented in various alternative arrangements discussed herein.

Figure 7:
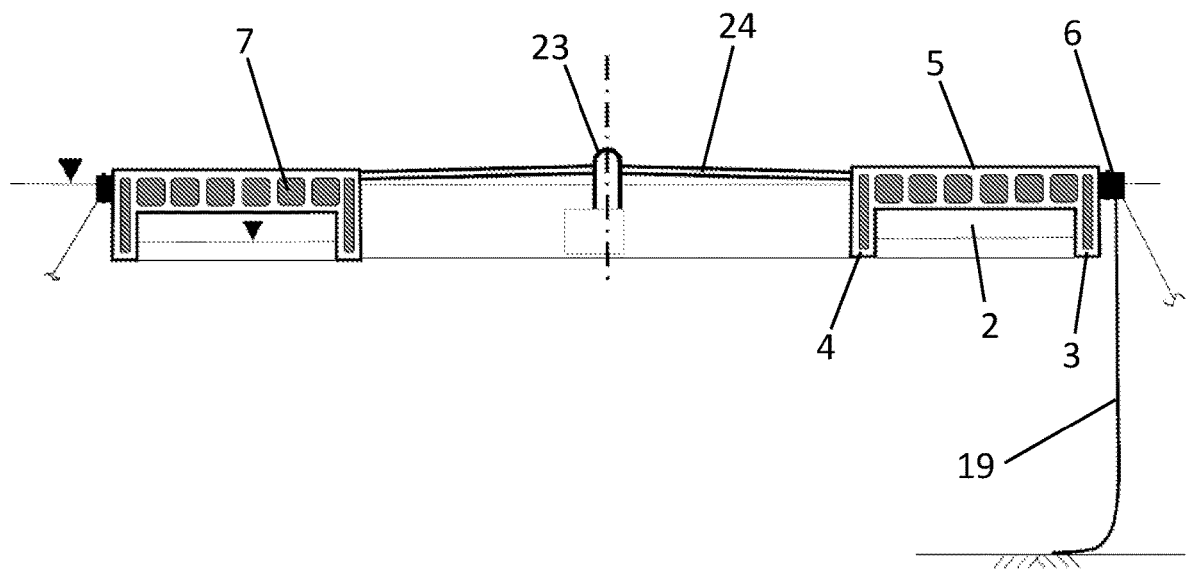
FIGS. 7, 8 and 9 disclose different ballasting and mooring arrangements.

FIG. 7 discloses a further exemplary arrangement, which comprises a flywheel 1 that features a central inverted nacelle 23. Any of the above described energy systems may be implemented and the arrangement is not to be limited in this regard. The central nacelle 23 provides an alternative means of taking on ballast. In such an arrangement it is preferable that the nacelle 23 is in fluidic communication with cells 7 of the flywheel structure through appropriate radially extending fluid carrying members 24. In the present arrangement these comprise pipes. The pipes may be spoke-like. Liquid entering the nacelle 23 will flow radially outwards through the pipes under centrifugal pressure. Deballasting may be through a suitable outlet, as described above, or otherwise. As with earlier described arrangements, a pump may be provided or not, which may also act as a turbine or be provided in addition to a separate turbine.

As a general point, the pump/turbine may be omitted from any arrangement to enhance the exit velocity of the deballasting water. Such a configuration offers a simplified auxiliary machinery fit and reduced skin friction.

Figure 8:
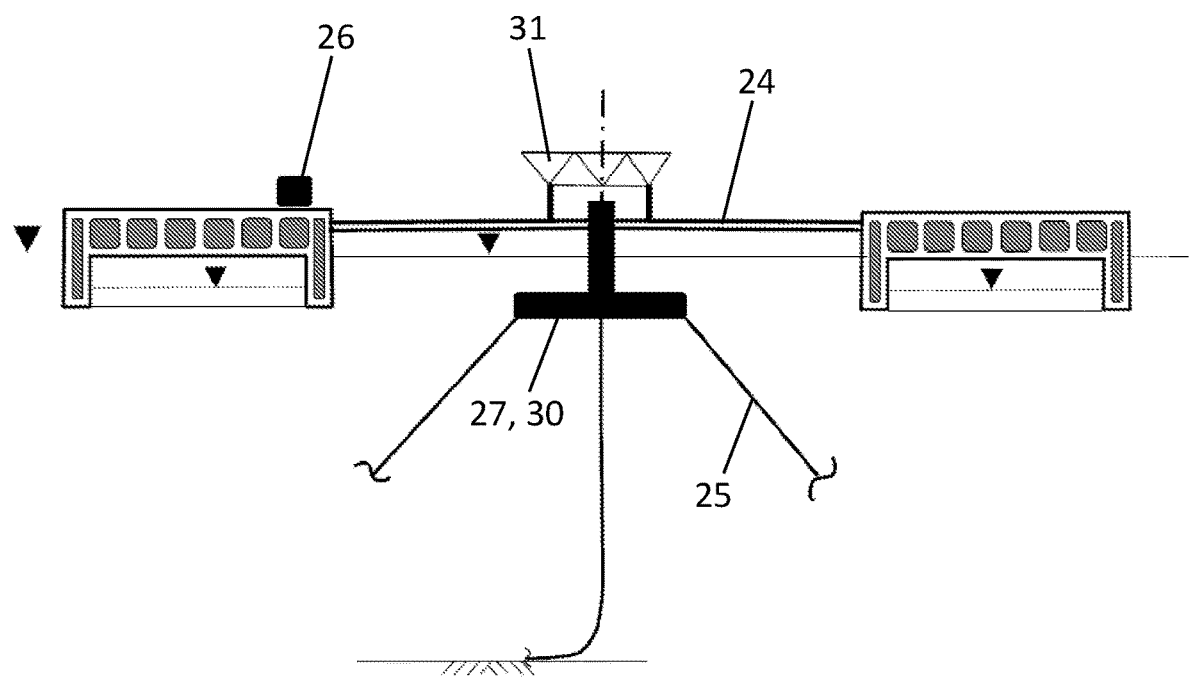

FIG. 8 shows an exemplary arrangement that is provided with mooring/support legs 25. Such mooring/support legs 25 may be attached to a central swivel 27, as shown. Regardless, they preferably deploy to the sea bed substantially within the plan footprint of the flywheel 1, so as to provide a compact configuration.

FIG. 8 also discloses an onboard module 26 which may be installed as needed on any of the above described arrangements but in particular on versions with onboard energy generation. The onboard module 26 may house various auxiliary machinery fits and utilities as needed, which auxiliary machinery in alternative arrangements may otherwise be housed in an integrated module, or otherwise located/housed.

Such conventional auxiliary machinery might include but is not limited to any one or more of the following:
Air compressors to manage the Air cushion pressure and volume, replacing air lost under the structure in extreme weather or by absorption into the sea water,
Voltage control to permit the combination of electrical energy feeds from multiple sources and its economic export to the onshore Grid.
Emergency power generation.
Fire main pumps.
Temporary or permanent living quarters. Any such manned space may be fitted with floors sloping down towards the central flywheel axis. The slope angle may be set such that line of action of combined gravitational and centripetal force mimics the normal gravitational line of action so that personnel can move around unhindered at the target circumferential velocity $V_T$.
Ballasting and/or deballasting pumps.
Communications and AI assisted instrumentation and control systems.
An electrolysis plant to generate hydrogen, and compress and condition it for export. The coproduced oxygen may also be dried, pressurized and exported if desired.

In arrangements comprising a swivel 27, the swivel 27 may provide for energy export by electrical cable and/or flexible hydrogen pipeline, in line with discussions above. It may further be arranged to provide for electrical energy import from external sources for storage as rotational kinetic energy.

In a preferred arrangement the swivel comprises a buoyancy tank 30. The buoyancy tank 30 will preferably be configured such that it is partially submerged in use.

The buoyancy tank 30 may aid in supporting the weight of component parts of the flywheel 1. The buoyancy tank 30 may aid in supporting the weight of one or more or all of the following component parts, when provided: the swivel, the helideck 31, the spoke elements, which may be fluid carrying as discussed above or may alternatively be purely structural, as in the depicted arrangement.

The buoyancy tank 30 may additionally or alternatively configure mooring/support legs 25, when provided, such that their line of action intersects the swivel 27 where it meets the spoke elements 24. Such an arrangement will minimise any significant bending moments on the spoke elements due to lateral forces restrained by the support/mooring legs.

As discussed, the flywheel 1 may optionally be provided with a helideck 31.

When provided, the helideck may be installed at the centre of the flywheel. In arrangements with spoke elements 24, these may provide support to the helideck 31 and further provide access facilities. In a closed circular configuration of the flywheel, such as that shown in FIG. 10A, for example, the helideck can simply be marked on the deck. In sufficiently large flywheels, as are anticipated within the scope of the present disclosure, there will be ample clear access to land a helicopter at its centre. Moreover, with a central position, the rotational velocity will be sufficiently low to provide no impediment to helicopter operation whilst the flywheel is in operation. It may, for example, take several minutes for a large flywheel to complete one revolution.

Figure 9:
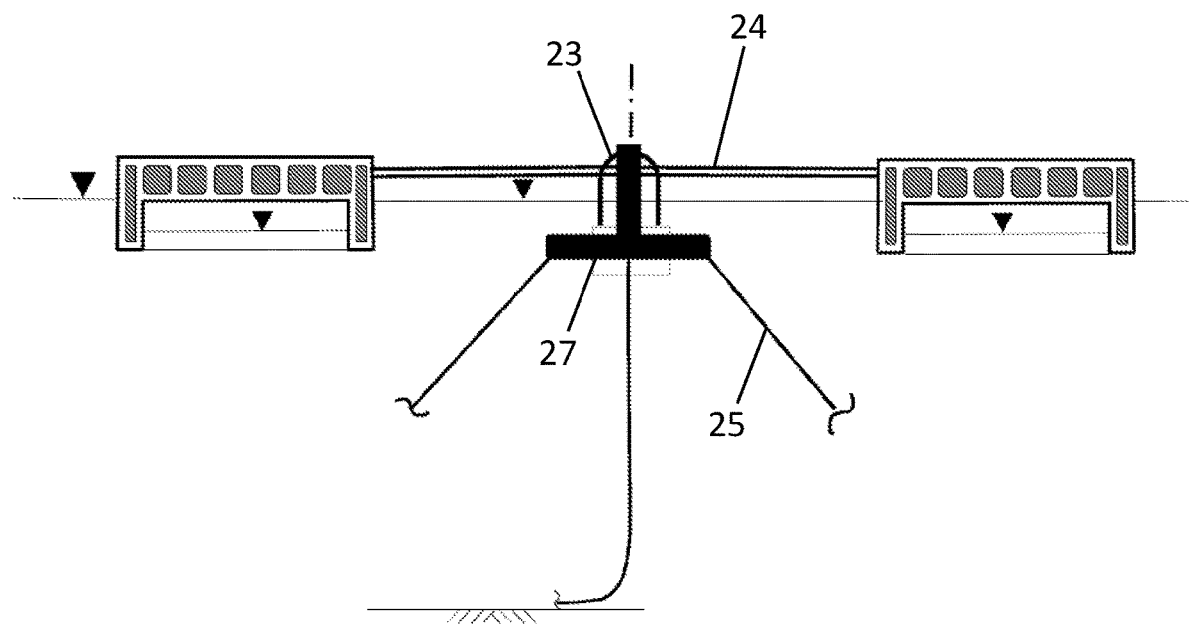

FIG. 9 shows an arrangement similar to that of FIG. 8, i.e. comprising a swivel 27, but further including a central inverted nacelle 23 such as that discussed in respect of FIG. 7. The swivel 27 and nacelle 23 may be combined into a single unit. As with the arrangement of FIG. 7, the spoke elements 24 preferably comprise pipes for ballasting purposes. Mooring supports/legs 25 are provided in accordance with the arrangement of FIG. 8.

As has been stated, and will be readily understood by those skilled in the art, different features/combinations of features from the different arrangements described above may be combined/varied. In particular, the disclosure of a particular feature in combination with other features of a particular arrangement does not tie those features together. The embodiments are non-limiting and for illustrative purposes only.

Figure 10:
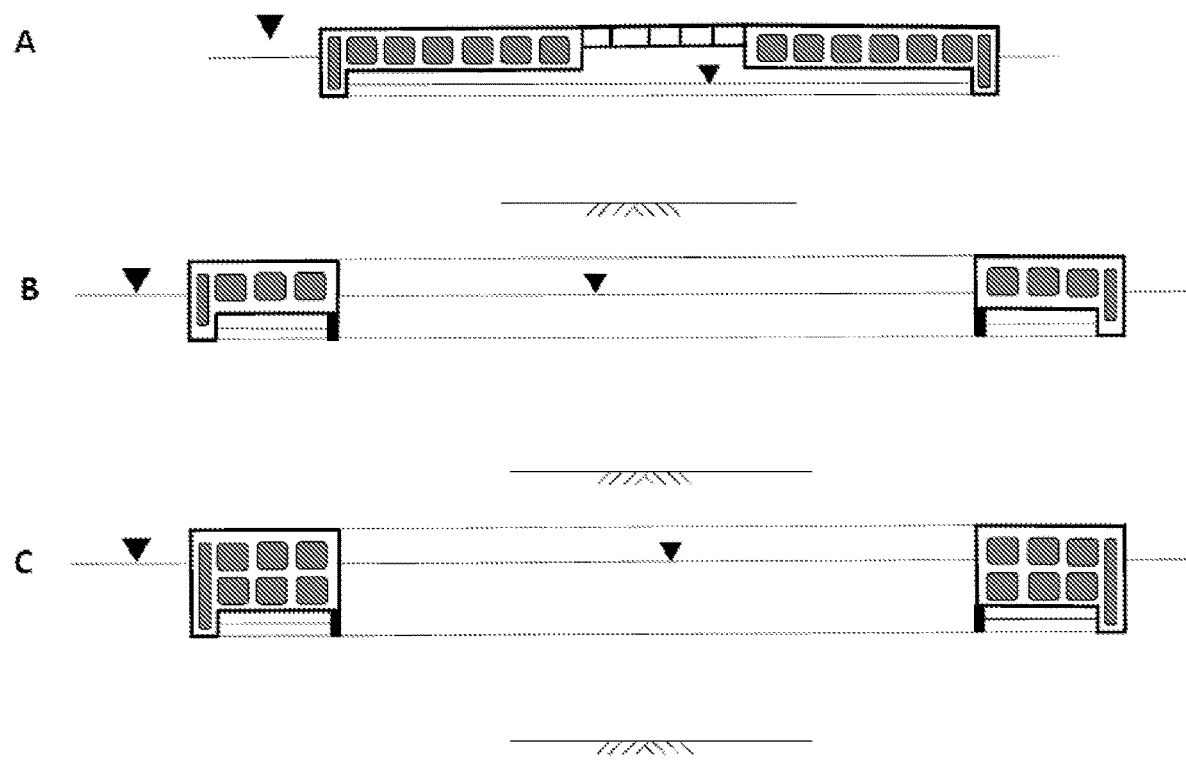
FIGS. 10A, 10B and 10C show sectional views of three differing flywheel arrangements.

FIGS. 10A, 10B and 10C show three different exemplary configurations for the flywheel structure which may be implemented in arrangements comprising any of the features discussed above in respect of the described arrangements.

FIG. 10A shows a closed circular configuration. This contrasts with the toroidal form of the flywheels discussed above. A closed configuration will generate lower skin friction than a toroidal arrangement as it has only one wetted surface penetration.

FIG. 10B shows a toroidal configuration. If this has the same plan surface area and mass as the closed circular configuration of FIG. 10A, it will have a larger energy storage capacity because its mass is concentrated around its periphery.

FIG. 10C shows a tiered toroidal configuration. If this has the same plan dimensions as the arrangement of FIG. 10B but twice the mass, it will have twice the energy storage capacity.

Note, however, that target tangential velocity $V_T$ of any flywheel configuration may be chosen to have a similar maximum value that limits, to a reasonable level, the skin friction between the outer circumference and the surrounding water. The upper limit on tangential velocity might, for example, be set at 80 km/hr. If, for example, a closed circular configuration, such as that shown in FIG. 10A and a tiered toroidal configuration such as that shown in FIG. 10C have the same Tangential velocity $V_T$, then the inherent energy storage advantage of the latter is mitigated by its rotational angular velocity being lower, as a consequence of its larger diameter (assuming this is the case).

FIGS. 10A to 10C are presented to help to illustrate design principals in accordance with the present disclosure and are otherwise non-limiting.

Figure 11:
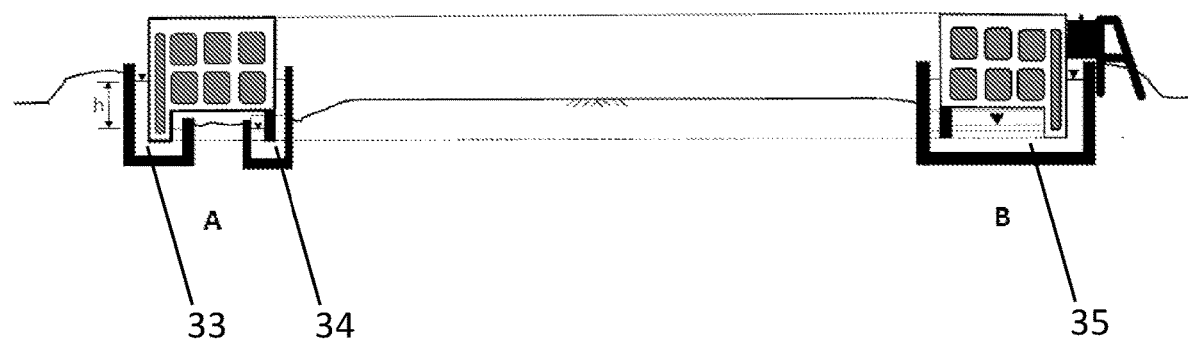
FIGS. 11A and 11B show different onshore arrangements.

FIG. 11 shows an exemplary, non-limiting, flywheel in complete cross-section. Whilst the flywheel is of tiered toroidal construction, it need not be so limited. It may be toroidal and formed in accordance with any of the above arrangements. It may otherwise be formed in a closed circular configuration.

FIG. 11A shows an onshore configuration option where the lower extremities of the inner and outer circumferences of the flywheel are submerged in separate troughs 33, 34 which would be completely circular in plan.

FIG. 11B shows an alternative onshore configuration option where the extremities are submerged in a single trough 35.

The choice between these two options is a matter of economics. Separate troughs, for example, may require less excavation on site than a single trough. However, an air-tight blinding may be required on the exposed earth between the two concentric troughs of the arrangement comprising separate troughs, to economically sustain the required target head of the air cushion. The troughs may be constructed in any suitable conventional manner, as will be readily appreciated by those skilled in the art.

Note that unlike an offshore flywheel, because the water in an onshore arrangement may be a segregated volume, it is possible and may be desirable to add friction reducing chemicals to the water, such as but not exclusively a long-chain polymer to reduce the drag forces on the flywheel or increase the target tangential velocity $V_T$ providing a greater energy storage capacity.

Note also that site economics may also be improved by choosing the elevation of a flywheel such that excavation under the flywheel to provide ground clearance provides a volume of excavated material sufficient to build an embankment that supports an outer separate trough.

A plurality of energy generation modules 6 may be provided. There may be three or more equally-spaced energy generation modules provided that are held in place circumferentially and radially by suitable support structures. The vertical elevation of Energy generation modules may be controlled by the position of the flywheel. The support structures may also be configured to retain the flywheel on location in plan.

Whilst the exemplary onshore arrangement is toroidal in form. It could equally comprise a closed circular configuration.

It is notable that the metrics of comparative economics between closed circular configuration, toroidal configuration and tiered toroidal configuration are different in the onshore case to the metrics controlling the choice of offshore configuration, for reasons including the following:

The necessity to decouple the flywheel from incident spectral wave energy by having a minimum overall diameter of approximately 1500 m is no longer applicable. A smaller diameter may suffice to meet site requirements of an onshore flywheel.

Only the outermost separate trough is required.

The area of blinding may be substantially larger as the air cushion extends to the entire plan area of the flywheel.

Other systems and considerations remain as for the offshore installations and it is to be noted, as will be readily appreciated by those skilled in the art that various aspects of the arrangements of the disclosed offshore arrangements may be introduced into onshore arrangements.

Whilst mentioned briefly, the apparatus has, so far, been discussed primarily in respect of the storage of externally generated energy. With reference to FIGS. 12 to 20, consideration will be given to power generation using the apparatus. The apparatus may be arranged to generate power from the wind, with the wind providing rotational kinetic energy to the flywheel for storage without any conversion.

For such purposes, a flywheel 1 in accordance with any arrangement described herein may be provided with a plurality of sails 37 attached thereto. The sails may be mounted on the deck 5 of the flywheel, forming, in effect, a large cross-flow wind turbine. They may be mounted otherwise. Any such sails may take numerous configurations, as will be appreciated by those skilled in the art. Some non-limiting exemplary sail arrangements are discussed below.

FIG. 12A shows one, exemplary arrangement that is provided with sails. This arrangement comprises continuously variable sail geometry, as is preferable. In the present, exemplary, arrangement a single flexible sail is provided that can be twisted into the optimal angle of attack to the wind direction prevailing at any elevation at fine increments above the water.

This arrangement takes accurate account of the continuously variable wind velocity and directions at different elevations. Such variations occur naturally but are also characteristic of the flow through a cross-flow turbine. In this exemplary arrangement there is a vertical mast 38, which is preferably rigid. Taking into account wind loadings from the sails to be accommodated by the mast, it may be segmented into a number of segments. The number of segments may be determined in dependence on the maximum tolerable bending moment and axial Euler buckling capacity of each mast segment.

FIG. 12A illustrates an arrangement that comprises two such segments, as will be appreciated, in line with the discussion above, there may be more or less segments in any arrangement provided according to the present principles. The vertical length of each such segment is preferably enhanced by the provision of a universal joint where that segment connects to the flywheel or to another segment, which will substantially eliminate bending moment at these intersections. Each segment may be restrained in plan circumferentially and radially inwards by rigging 39, which may preferably be diagonal, and restrained radially outwards by rigging 40, which may be substantially horizontal.

Suitable instrumentation/sensing devices may be provided for determining the continuously varying optimal angle of attack and/or aerofoil shape of the continuously variable sail geometry at each increment of elevation, and/or the stress levels at length increments of the mast segments. An AI system comparable to those used in advance aeronautical practice may be implemented, as will be readily appreciated by those skilled in the art.

FIG. 12B shows a similar sail configuration to FIG. 12A. The arrangement of FIG. 12B again comprises a plurality of sail sections. In this configuration, however, a plurality of rigid sail sections are deployed. Each section may be configured, for example, in the manner of a conventional aircraft wing construction. With the provision of rigid sail sections, no separate rigid vertical mast is required, although arrangements with such a mast will be possible. Each individual sail section can be rotated independently to align it with the average wind speed and direction over its length to provide the best available direction and magnitude of lift over that section. The greater the number of sections, the more accurately the sail sections will be able to track the prevailing wind speed and direction at each elevation increment. FIG. 12B shows four such sections by way of example. It is not to be limited as such. There may be more or less sections provided. As with FIG. 12A, rigging 39, 40 is provided to support the sail structure. In consideration of the number of sections to be implemented, increasing the number of sections of sail sections will increase the required rigging. With increased rigging there will be an increase in drag. It will be desirable to strike an efficient balance.

As with the arrangement of FIG. 12A, suitable instrumentation/sensing devices may be provided for input to a control system of the sails. An AI system may again be implemented.

Figure 12:
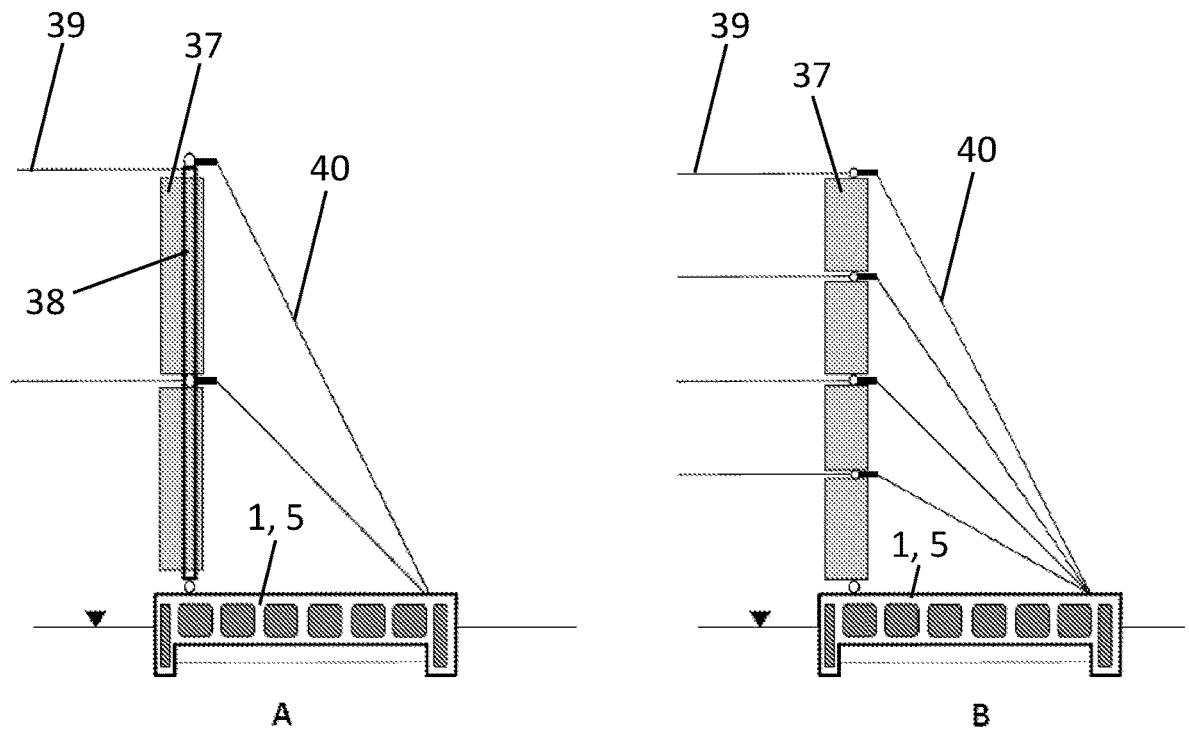
FIGS. 12A and 12B show different sail arrangements.
Figure 13:
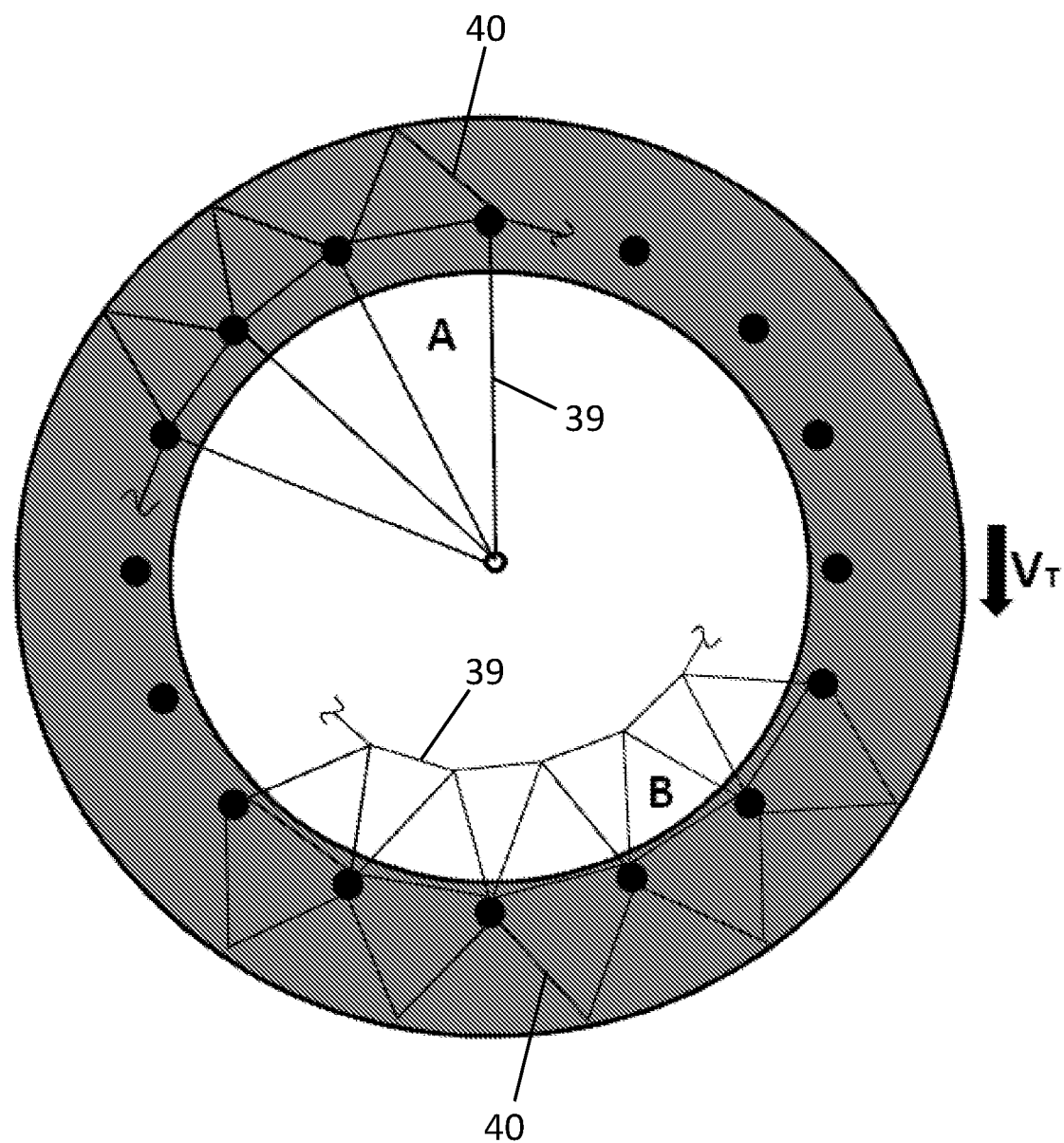
FIGS. 13, 14, 15A, 15B, 16, 17, and 18A, 18B and 18C disclose different arrangements for the sail arrangements of FIGS. 12A and 12B.

FIG. 13 shows the configuration of FIG. 12A in plan. It is to be noted that two alternative possible exemplary rigging options are partially shown in FIG. 13, labelled respectively as A and B. It should be appreciated that these are alternatives, wherein only one of these rigging arrangements will be implemented at a time and in respect of every provided mast. According to arrangement A, each strand of rigging 39 extends to the centre of the flywheel. In Arrangement B, each strand 39 extends to be supported radially outward from the centre of the flywheel. A suitable supporting structure may be provided for such purposes. Of course, in arrangements where the flywheel is not toroidal, the top deck will be available for mounting the ends of the rigging stands thereto. The comparative economics of cost and drag forces in operation will likely dictate the preferred configuration of rigging for any given design. Moreover, alternative arrangements to A and B will be readily appreciated by those skilled in the art. As stated, these arrangements are purely exemplary and may be altered or modified in numerous ways, as will be appreciated by those skilled in the art.

Note that facilities may be provided such that the rigging cable lengths can be adjusted to safely lay the entire sails and rigging facilities flat onto the deck of the flywheel, radially or circumferentially as appropriate, for maintenance and subsequent return to the operational configuration shown.

Figure 14:
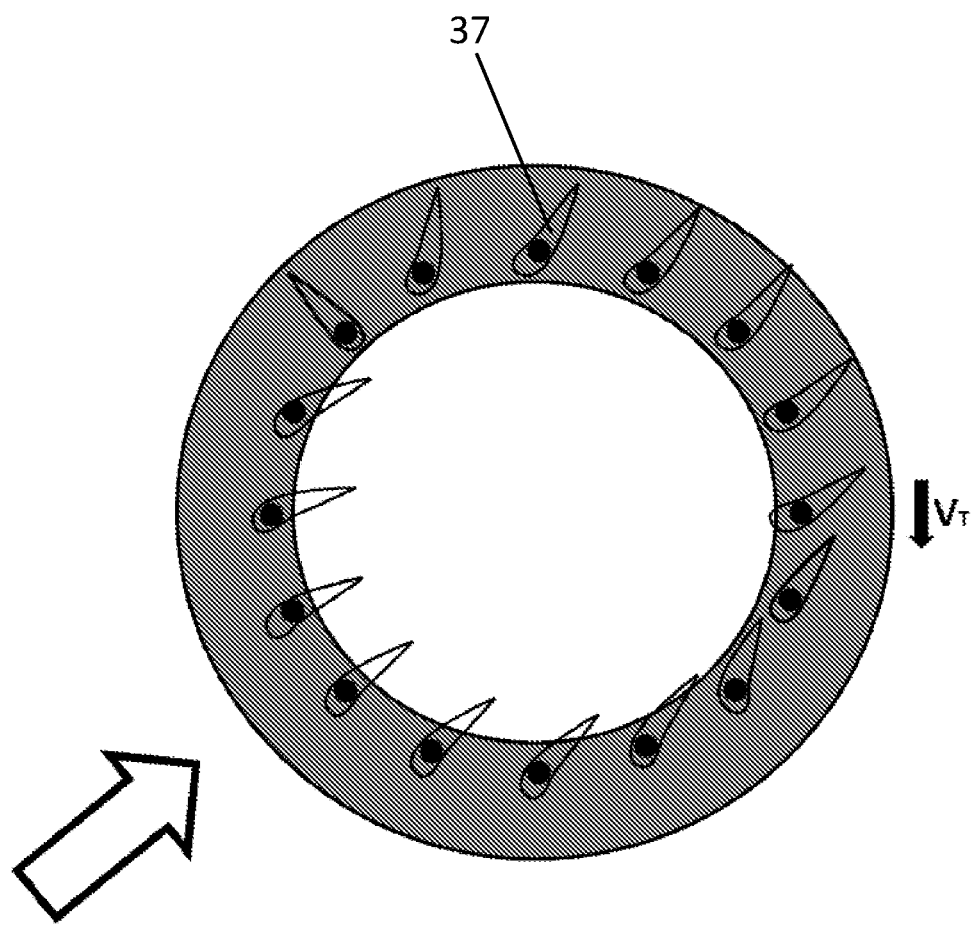

FIG. 14 is provided to illustrate the manner in which the aerofoil shape of both continuously variable sail geometry, as discussed in respect of FIG. 12A, and rigid sail sections, as discussed with respect to FIG. 12B, can reverse and also adopt a symmetrical shape with reference to the average wind direction, which is illustrated by the arrow.

Viewed in the wind direction, the sail sections may be configured, irrespective of their specific construction, such that the aerofoil forms as illustrated are adopted, whereby sail sections in the remote half sector of the flywheel shape and the nearer half sector contribute to clockwise rotation. The sail sections at the junction of the nearer and remote half sectors are preferably in the symmetrical transition shape as illustrated. The left hand extreme sail section is preferably square to the wind direction to contribute to the clockwise rotation. The right hand extreme sail section preferably has a symmetrical transition shape viewed in the wind direction to be be facing straight into wind direction to minimize its drag forces.

Note that the orientation and shape of each aerofoil section is preferably not simply maximized by the control system to give maximum lateral lift force, wherein the parameter controlling the tangential velocity may be the moment of that lateral lift force around the central vertical axis of rotation. Thus, the control system preferably continuously computes and maximizes the product of lift force and moment arm about the central axis, and adjusts aerofoil form and direction accordingly. It follows that the control system may be configured to set an angle of attack producing less than maximum lift but in the direction of a larger moment arm.

With reference now to FIGS. 15 to 18, there is shown an exemplary, non-limiting, configuration of the mechanical components for a control system for orienting the sails in their appropriate shape and direction. The disclosed system may be implemented in respect of either the continuously variable sail geometry or the rigid sail section. It is described in the context of a rigid vertical mast, but may be suitably adapted for use in arrangements that omit the mast, such as but not limited to arrangements comprising rigid sail sections, as discussed above. As will be readily appreciated by those skilled in the art, numerous alternative mechanical arrangements will be possible.

FIG. 15A discloses a short aerofoil shape control cylinder 41 surrounding the rigid vertical mast 38. The aerofoil shape control cylinder 41 carries a spherical bearing 42 and can be rotated with respect to the rigid vertical mast 38 in either direction, as indicated, by an actuator 43 mounted in a bush in the rigid vertical mast 38, so as to drive a toothed wheel 44 engaging with an opposing rack. The aerofoil shape control cylinder 41 is maintained concentric with and is supported by two or more Idler wheels 45. Hydraulic supply and return pipes 46 power all elements of the entire system under control of signals received from cables. Status feedback signals are also transmitted back by the cables. The computerized management, preferably making use of AI, of all the control system elements is one of the facilities that may be housed in either integrated module or onboard module 26 as appropriate.

FIG. 15B discloses the provision of a concentric shorter sail orientation cylinder 47 surrounding the aerofoil shape control cylinder. Sail orientation cylinder is rotated in either direction by actuators mounted in the rigid vertical mast and is supported by and held concentric by a plurality, preferably at least three, idler wheels.

Figure 16:
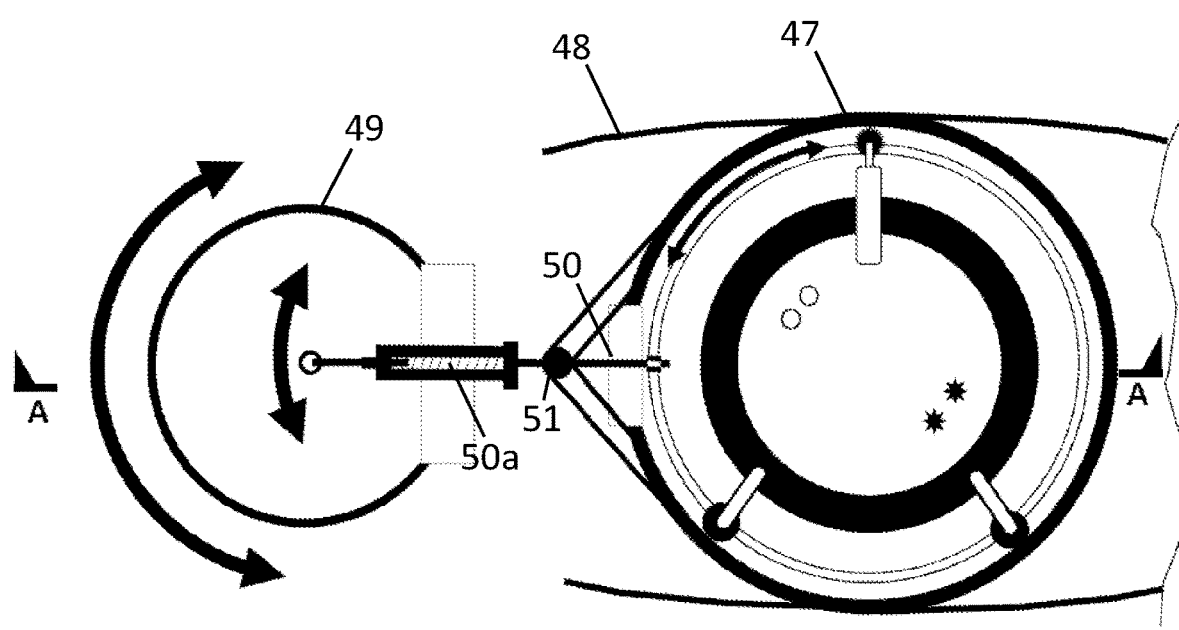

FIG. 16 discloses an exemplary arrangement in which the sail orientation cylinder 47 carries a sail profile stretcher 48. An aerofoil nose shape profiler 49 is mounted on a support arm 50 containing a telescopic section 50a. The support arm is mounted on a trunnion carried on the sail orientation cylinder and slides through a bushing carried in the spherical bearing 42.

Figure 17:
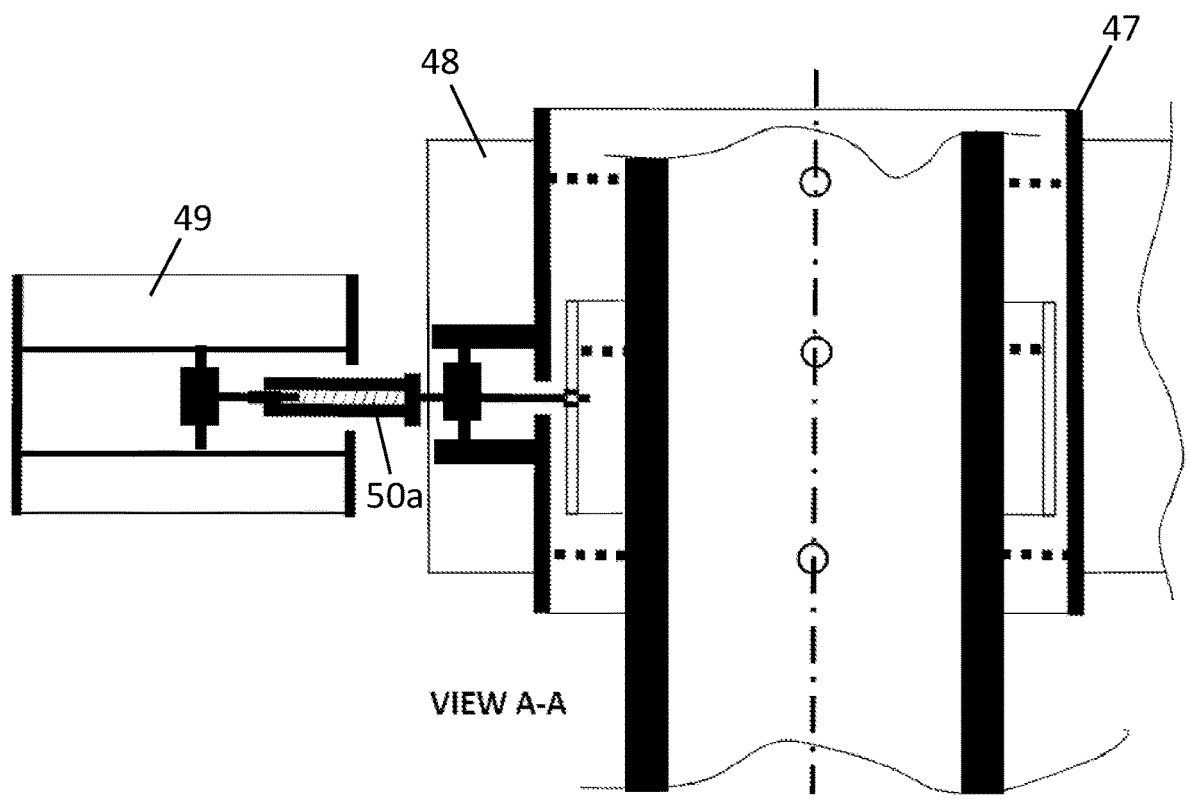

FIG. 17 presents section "A-A" on FIG. 16 and shows in elevation the same components disclosed in plan in FIG. 16.

Figure 15:
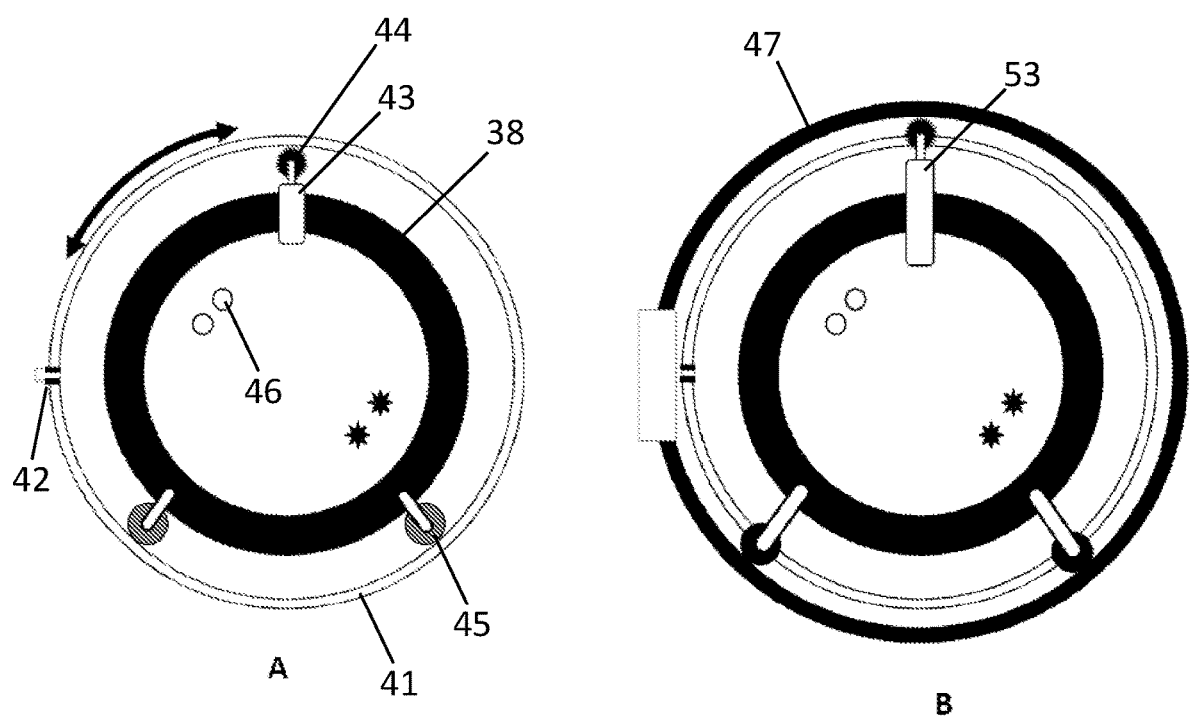

Note that the complete assembly disclosed in FIGS. 15 to 17 may be installed at frequent increments of elevation where continuously variable sail geometry is deployed. In contrast where rigid sail sections are deployed, one compete assembly may be fitted, for example, at the base of each rigid sail section.

FIGS. 18A, 18B and 18C exemplarily disclose details of three possible key shapes of the aerofoil sections in line with the discussions of FIG. 14 above.

Figure 18:
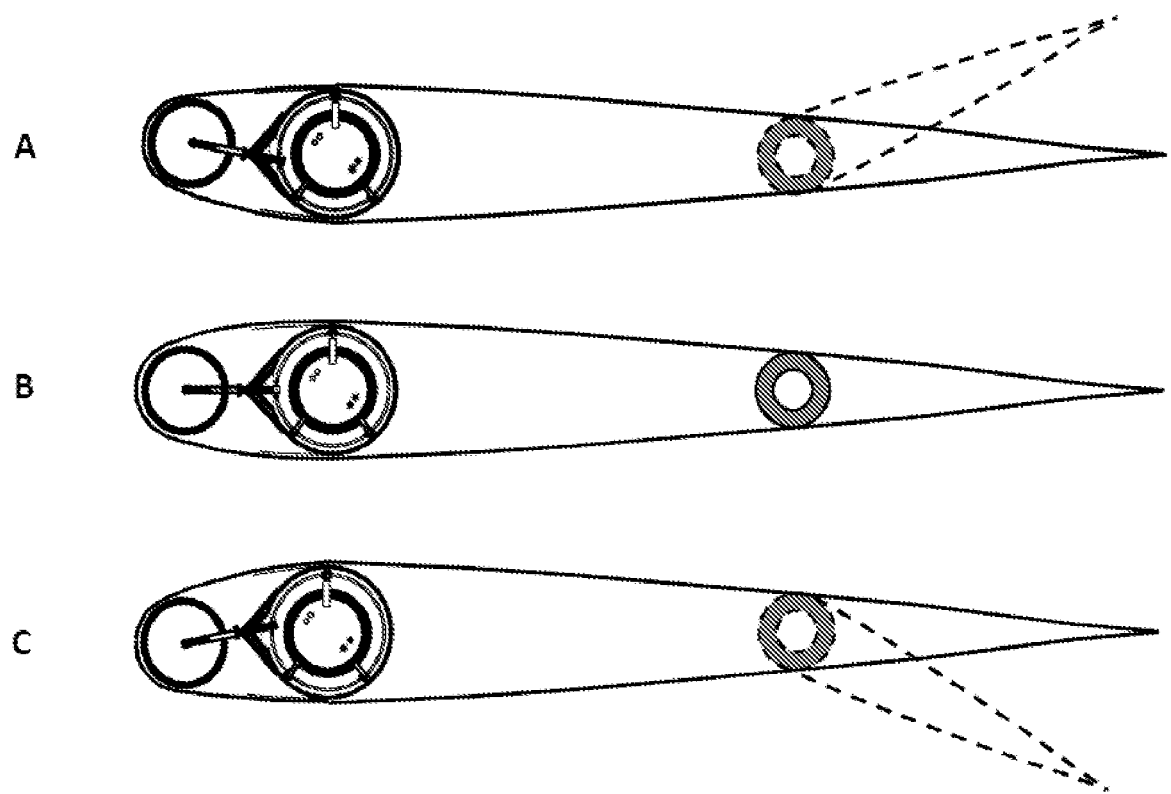

In one preferred exemplary arrangement, the leading edge of the aerofoil sections may be made of strong fabric attached on both upper and lower surfaces of the aerofoil sections to the sail profile stretcher which is itself manufactured in a thin flexible material such as but not limited to sheet steel, aluminium, plastic or a composite material. Aerofoil sections can further comprise the sail profile stretcher continued back to the trailing edge as shown in FIG. 18 and vertically over the entire surface of the continuously variable sail geometry or rigid sail sections. Alternatively, the after section of the aerofoil sections can also be made of strong fabric in which case similar mechanisms, such as shown on FIGS. 16 and 17 to change the forward body of the aerofoil sections, can be additionally installed to change the shape of the after body of aerofoil sections.

One alternative exemplary preferred solution comprises the sail profile stretcher continued back to the trailing edge to segment and mounted on an actuated hinged section at the most extreme section, in a manner analogous with the flaps on an aircraft wing as shown in dotted lines.

To rotate any sail in plan as shown in FIG. 14 at any given elevation but without changing the shape of its aerofoil, the actuator and actuators may be operated in unison so that there is no relative rotation between them. To change the shape of the aerofoil section, either the actuator 43 or the actuator 53 is operated to create relative rotation between the aerofoil shape control cylinder and the sail orientation cylinder. This relative rotation is shown on FIG. 16 to move the aerofoil nose shape profiler in either direction. To avoid wear on the flexible fabric forming the leading edge of the aerofoil sections, the aerofoil nose shape profiler may be arranged to rotate in a clockwise or anti-clockwise direction. The flexible fabric may be accommodated by the telescopic section mounted in the support arm.

Where the control system so demands, the actuated hinged section may be deployed at the same time to further change the shape of the aerofoil sections.

Figure 19:
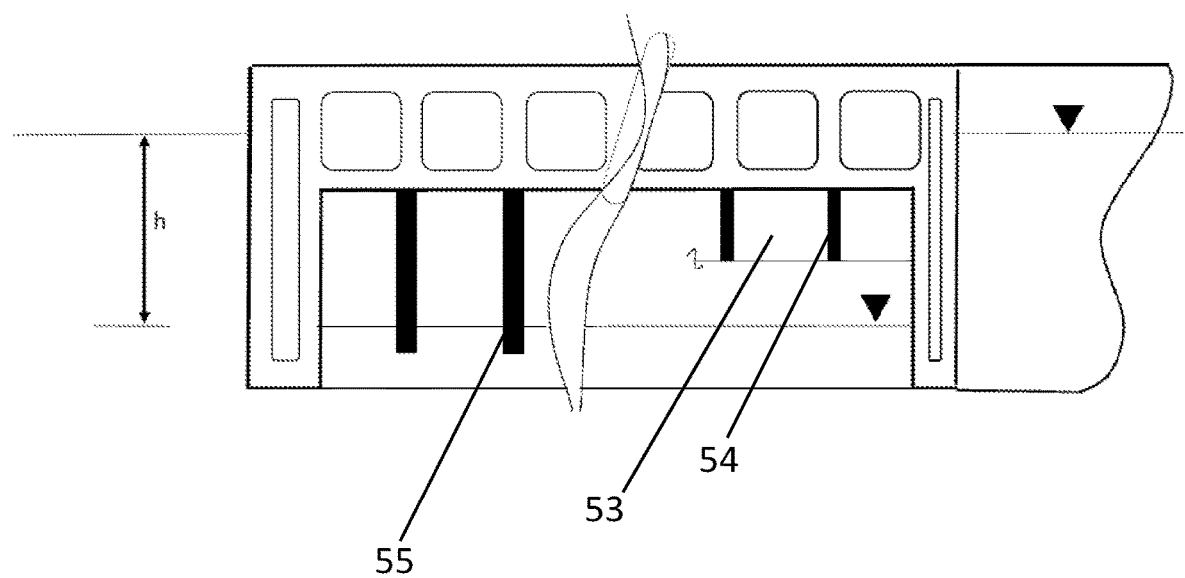
FIGS. 19 and 20 disclose typical damage stability enhancement arrangements

FIG. 19 discloses some exemplary, non-limiting, measures that may be taken to enhance the damage stability of a flywheel in accordance with any of the above arrangements. It should be noted that FIG. 19 shows two differing part sections of a toroidal flywheel in elevation.

FIG. 19 first discloses the fundamentally superior inherent damage stability of any flywheel provided by the cellular structure which forms a "double hull". Two separated surfaces would have to be breached to permit an air escape. Further enhancement may be obtained by extending selected radial cell walls 53 and circumferential cell walls 54 below the deck level but above the lower boundary of the air cushion forming open cell circumferential walls and open cell radial walls. In the event of the air cushion being released to atmosphere, the freeboard of the flywheel will reduce as it sits lower in the water up the point where open cell circumferential walls and open cell radial walls enter the water surface and their trapped air compresses to the point where buoyant equilibrium is restored, except in whichever cell or cells have been opened to atmosphere for whatever reason. The multiplicity of air cushions in the many intact cells will be designed to provide an adequate measure of compliance with wave action sufficient to maintain an adequate although reduced freeboard and mitigate damaging bending moments for long enough to recover the damaged flywheel to shallow water and make the necessary repairs.

Further integrity when damaged may be provided by extending one or more circumferential cell 55 walls down through the air cushion into the water below. This will isolate the loss of air cushion to the annular ring or rings accidentally opened to atmosphere and limit the consequent freeboard reduction in the damaged condition. There is, however, an increased skin friction penalty during operation.

FIG. 19 also confirms that the inverted triangle symbol indicates the water level on all Figures and that the head difference between the free water surface and the surface of air cushion is Head h.

Figure 20:
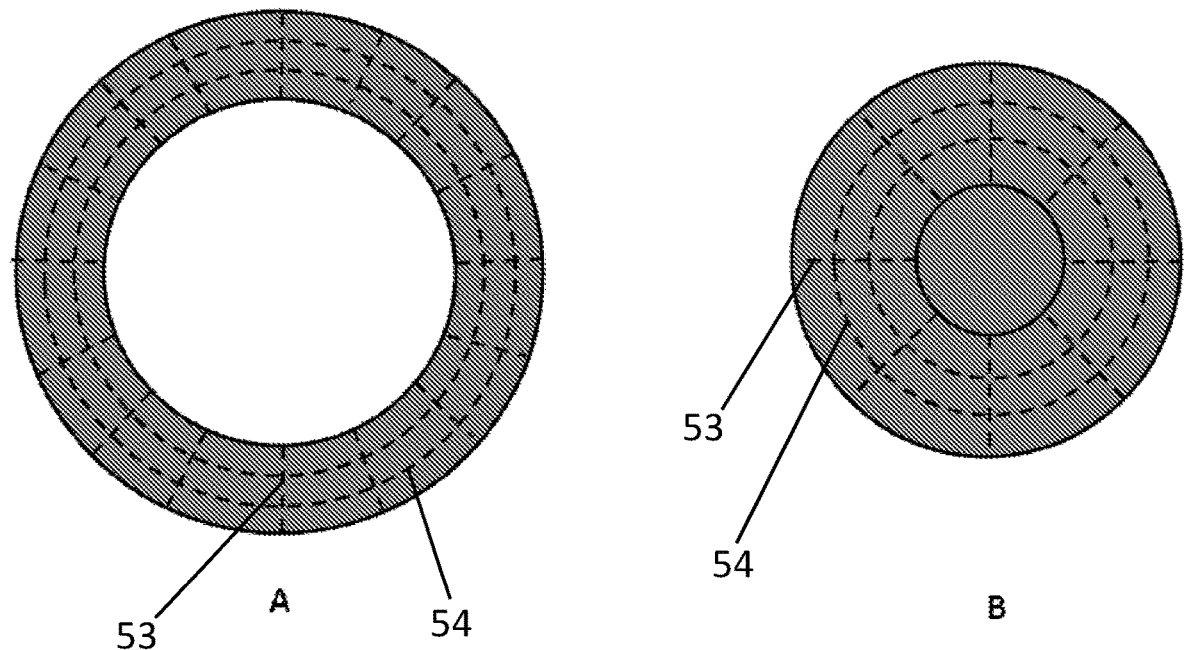

FIG. 20 shows, in plan, two notional flywheels, a closed circular configuration and a toroidal configuration. Exemplary, non-limiting, open cell circumferential walls and open cell radial walls, as discussed with reference to FIG. 19 are indicated.

Numerous further configurations can be envisaged within the context of the foregoing description. Two preferred, but non-limiting, examples are discussed with reference to FIGS. 21 to 23. It must be noted that aspects of these arrangements may be combined with aspects of any of the above described arrangements. The examples shown are not to be limited. By way of example, the flywheel configuration of FIGS. 21 and 22 may be implemented in place of one of the alternative flywheel structures in any of the above described arrangements and/or any of the features of any of those flywheels may be introduced into a flywheel according to the arrangements discussed here. Moreover, any of the power generation arrangements discussed in reference to FIGS. 12 to 20 may be implemented with a flywheel configured in accordance with the discussions below.

Figure 21:
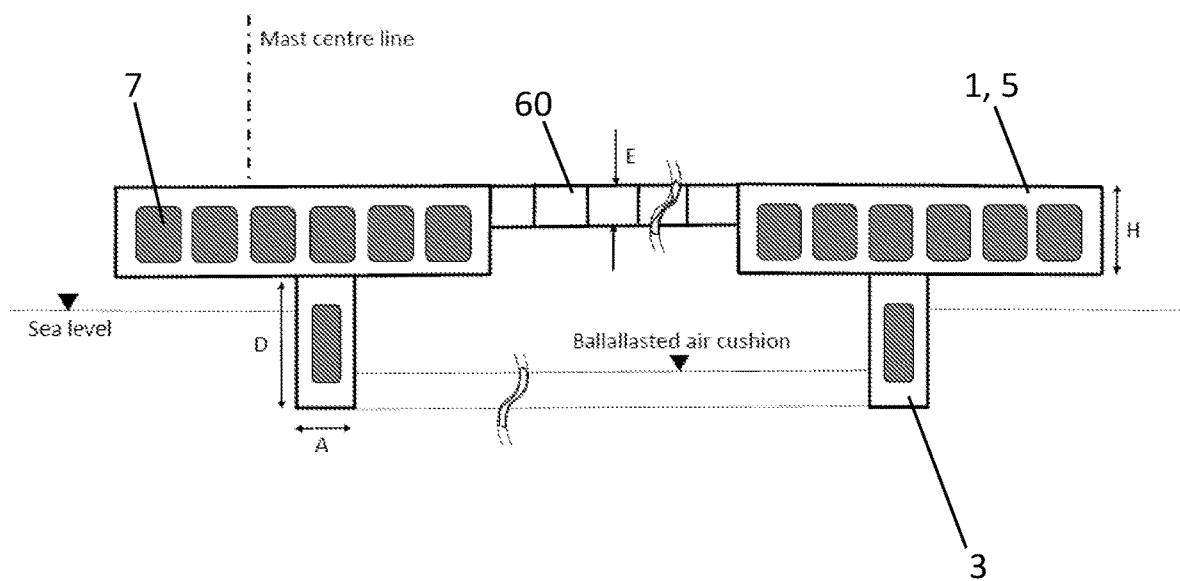
FIG. 21 shows a preferred optimized flywheel configuration in sectioned elevation.
Figure 22:
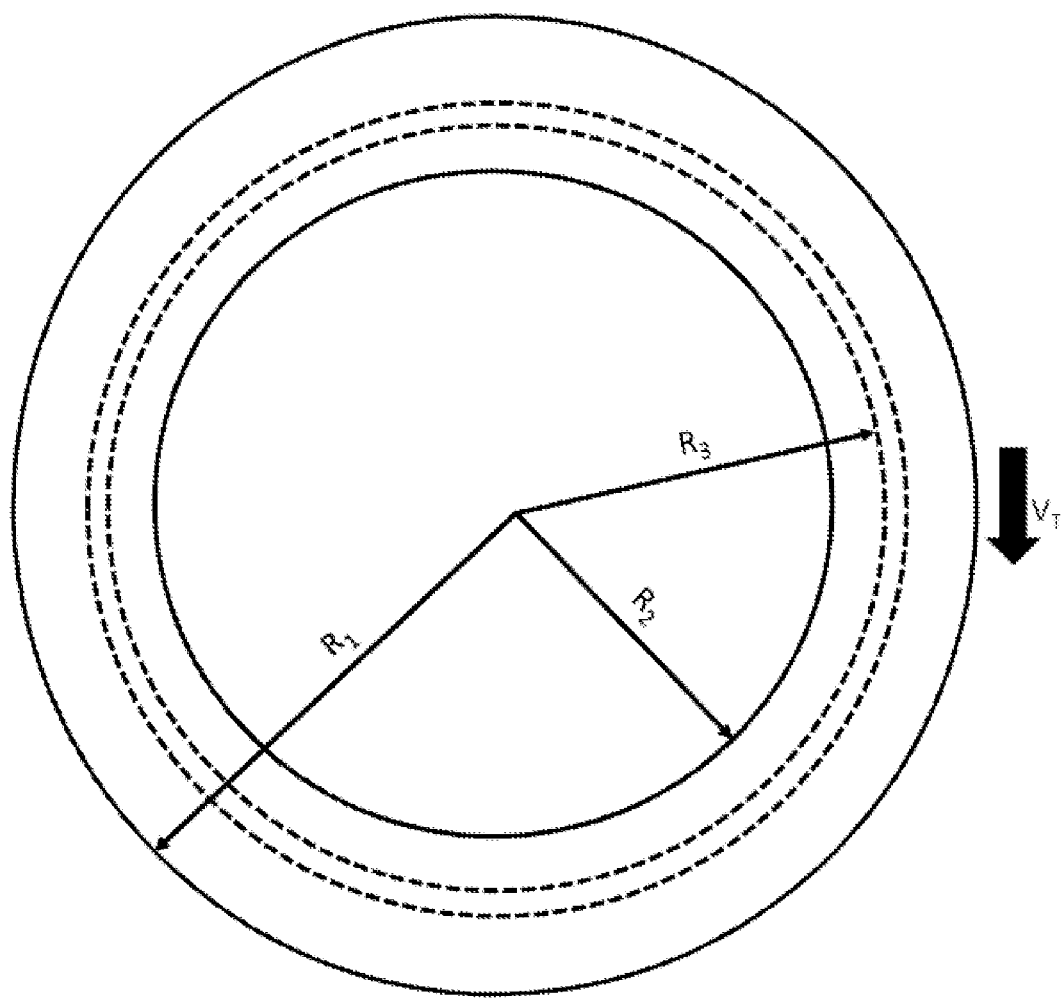
FIG. 22 shows the flywheel of FIG. 21 in plan view.

FIGS. 21 and 22 show an closed flywheel configuration in elevation and plan views respectively. The flywheel 1 has a toroidal structure. However, the open centre of the toroid is closed off by a cover 60. The form of the cover is not particularly limited. In the exemplary depicted arrangement, it takes the form of a lightweight airtight disc. With the centre of the toroid closed off, there may be provided a single circumferential wall 3. This contrasts with the earlier described toroidal structures. It should be noted, however, that a cover such as that discussed here could be used with any of the toroidal flywheels described above, or any other form of toroidal flywheel comprising a pair of circumferential walls 3, 4. The use of a single dependent circumferential wall 3 is preferred, since it is aids in reducing skin friction drag from the water.

The cover 60 may be of cellular form. This allows for a rigid lightweight structure. Moreover, a cellular cover may be ballasted, in line with the discussions above of ballasting. A ballasted cover adds to the energy storage capacity, possibly increasing the deadweight of the disc to more closely balance the air pressure in the air cushion, leaving the cover relatively lightly stressed in operation. Alternative structures for the cover include, but are not limited to, a lightweight frame, formed from steel or otherwise, closed with an airtight skin of steel, concrete, glass reinforced plastic, airtight fabric, or other suitable materials.

Adopting a closed disc configuration for the toroidal flywheel in this way can significantly reduce the Air Cushion thickness, minimising the dependent wall depth and its wetted surface area.

The dependent circumferential wall may be stepped in a significant distance from the outer periphery of the toroid, i.e. the circumferential wall may be shifted radially inwards from the periphery of the flywheel. This is beneficial, since it acts to reduce its circumferential length as indicated in FIG. 22, thereby reducing the skin friction drag whilst maintaining adequate hydrostatic stability. In alternative arrangements, however, the circumferential wall could be provided at the periphery. The toroid and central disc are preferably arranged to remain above water level by a distance sufficient to reduce wave impact.

Figure 23:
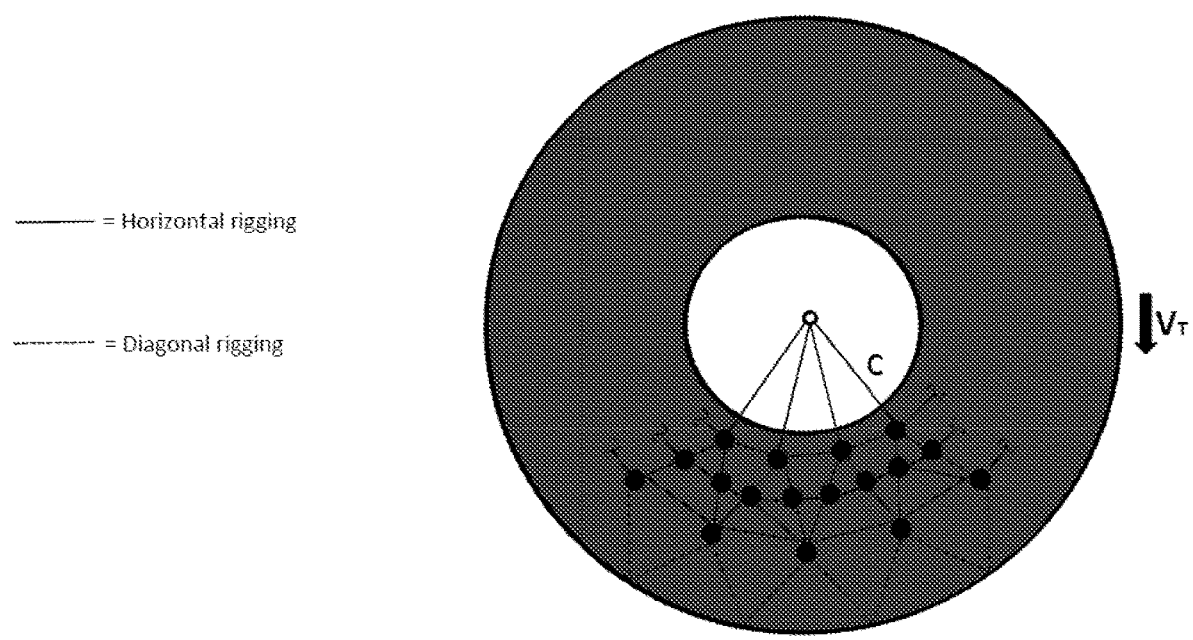
FIG. 23 shows a preferred optimized arrangement C to FIGS. 12A and 12B.

FIG. 23 shows a third preferred example C of the rigging arrangement in FIG. 12. This configuration responds to the observation that in practice, the spacing between masts may be much closer than indicated diagrammatically in FIG. 13 and as a result, the diagonal rigging to each mast will overlap the diagonal rigging of several adjacent masts forming a nest of cabling and possibly throwing a wake shadow onto the sails, which may limit their aerodynamic performance to some extent. The number of diagonal rigging legs can be dramatically reduced as shown in FIG. 23 by arranging the masts into several rows at differing radii, and supporting them circumferentially and laterally with horizontal rigging. The corresponding increase in total horizontal rigging is considerably less than the saving in diagonal rigging, thereby providing a saving both in drag forces and cost.

Numerous alternative mast and/or rigging arrangements will also be possible, as will be readily appreciated by those skilled in the art.

Furthermore, in the arrangement of FIG. 23, the horizontal rigging throws a wake shadow forming a horizontal disk at the level of the junction between vertically adjacent sails, which causes little corruption to the air flow profile over the sails, thereby improving performance. The cables at each horizontal rigging level will also produce less drag per unit length than the diagonal rigging as one complete horizontal pattern of rigging lies within a common turbulent wake to a greater degree than the diagonal rigging.

The masts are shown stepped in from the outer circumference of the toroid by a distance W. Distance W is chosen to be sufficiently large to provide a sensible geometry to the diagonal rigging. Further increase in W reduces the number of masts that can be installed and reduces the lever arm of the sails' lift force around the flywheel vertical axis. As will be appreciated by those skilled in the art, a suitable balance will be struck in dependence on the specific implementation.

Figure 24:
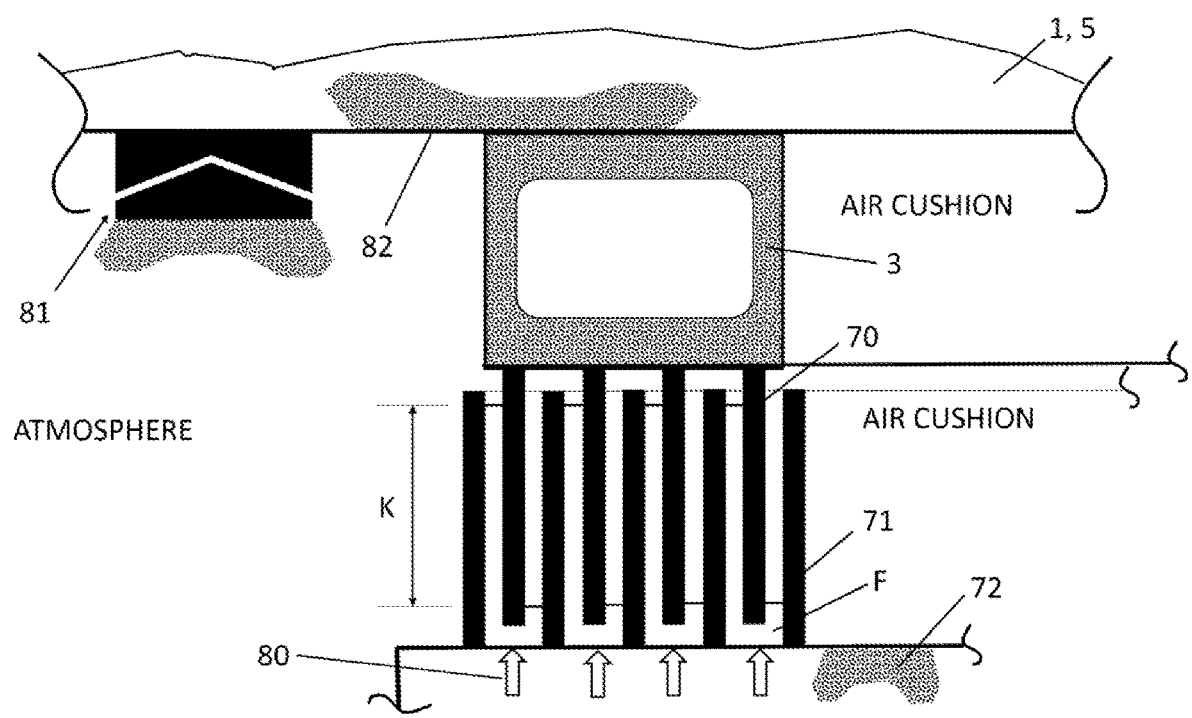
FIG. 24 shows a partial sectional view of a preferred sealing arrangement.

With reference to FIG. 24, there is shown a partial sectional view of an arrangement of an apparatus comprising an alternative fluid seal, particularly suited for use in onshore arrangements. The fluid seal comprises a segmented labyrinth. In the present arrangement, the labyrinth is formed by multiple interlocking cells, each of which is formed by a dependent wall 70, depending from the flywheel 1, and a facing wall 71, projecting in opposition to the dependent wall 70. There are four of the interlocking cells in the depicted arrangement. It should be appreciated that in alternative arrangements there may be more or less interlocking cells provided. As is seen in FIG. 24, each interlocking cell contributes a head difference K in the water or other fluid F trapped between the walls 70, 71. There is cumulatively formed a head difference equal to the pressure head in the air cushion. In FIG. 24, with four cells, the air cushion head equals 4K. The walls 70, 71 extend circumferentially. The walls 70, 71 are not particularly limited in terms of material or form, as will be readily appreciated by those skilled in the art. Whilst the dependent walls 70 are shown to depend from a circumferential wall 3 of the flywheel 1, in alternative arrangements it is possible the circumferential wall 3 could be omitted with the dependent walls 70 attached directly to the underside 82 of the deck 5. The walls 71 may be attached to a suitable foundation 72, which could be concrete or otherwise. The fluid F in the labyrinth seal traps the gas in the opening 2 to define the air cushion. The flywheel 1 may incorporate any of the features of the flywheels described above in any combination. In a preferred example, the flywheel may be toroidal with a cover, taking a form such as the flywheel 1 discussed with reference to FIG. 21. It may, of course, be otherwise formed.

FIG. 24 additionally shows, optional fluid injection ports, indicated by arrows 80, which can optionally be sited for fluid injection into all or selected cells of the sealing labyrinth at appropriate points around the periphery of the labyrinth to provide desirable operational functions including but not limited to the following:

- Maintaining the optimal head difference K in each cell by pumping water into or draining off water from selected labyrinth cells.
- Maintaining the optimal head difference K in each cell by pumping compressed air into or releasing it from selected labyrinth cells.
- Draining off unduly hot water caused by fluid friction from selected labyrinth cells and replacing it with cool water.

Injecting fluid friction reducing chemicals into the water in selected labyrinth cells.

In alternative arrangements, the fluid injection ports 80 may be omitted.

Further shown in FIG. 24 is an optional magnetic levitation ("MAGLEV") unit 81, which may, as will be appreciated by those skilled in the art, provide desirable operational functions including but not limited to the following:

Converting electrical energy input into stored mechanical energy through an induced tangential torque.

Conversely, converting stored rotational mechanical energy into electrical energy output through an induced tangential torque.

Providing additional vertical support supplementing that provided by the air cushion.

Holding the vertical and horizontal position of the entire flywheel assembly within sufficiently tight limits to facilitate its construction within practical tolerances.

Limiting any tendency by the entire flywheel assembly to develop resonant oscillations.

It should be appreciated that the depicted configuration of the MAGLEV unit 81 is purely schematic and should not be taken as limiting. The MAGLEV unit 81 may take any suitable form, as will be readily appreciated by those skilled in the art. The inverted "V" shape shown for the interface between the rotating top section and the stationary lower section is just one of many optional configurations that provide both vertical and horizontal support and alignment. Other such optional configurations include but are not limited to separate vertical and horizontal MAGLEV units or an arrangement where one such separate unit is a MAGLEV unit and the other is a conventional mechanical configuration, a diagonal interface forming the frustum of a large cone or inverted cone around the entire periphery of MAGLEV unit 81, an upright "V" shape, a "W" or "M" shape.

It should be appreciated that the MAGLEV unit 81 may be omitted or, moreover, may be integrated into alternative arrangements that omit the labyrinth seal, as will be appreciated by those skilled in the art.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. A power generation and/or storage apparatus comprising:
a buoyant flywheel, wherein the flywheel is arranged, in use, in contact with a body of liquid for rotation about a substantially vertical axis, an underside of the flywheel comprises a circumferentially extending opening, wherein, in use, gas is trapped within the opening by the surface of the liquid to define a gas cushion for supporting the flywheel, wherein the flywheel has a cellular structure comprising a plurality of cells, which are each bounded by radial and circumferential walls, and a ballast system is provided, which comprises a plurality of valves, an inlet manifold and an exhaust manifold, such that the valves are arranged for selectively controlling the introduction and evacuation of liquid from the cells.

2. An apparatus as claimed in claim 1, wherein the circumferential opening extends substantially continuously around the entire circumference of the flywheel.

3. An apparatus as claimed in claim 1, wherein the flywheel is substantially toroidal.

4. An apparatus as claimed in claim 3, which comprises a cover, which is air-tight and closes off the centre of the toroid.

5. An apparatus as claimed in claim 4, wherein the cover comprises at least one of a disc and a frame closed by a skin, wherein the disc is cellular, and the skin is comprised of at least one of: steel, concrete, glass reinforced plastic or airtight fabric.

6. An apparatus as claimed in claim 4, wherein the one or more-circumferential walls depend substantially vertically in use.

7. An apparatus as claimed in claim 1, wherein the opening is provided between the radial and circumferential walls.

8. An apparatus as claimed in claim 7, wherein one of the circumferential walls is a peripheral wall.

9. An apparatus as claimed in-claim 7, wherein the circumferential walls penetrate the surface of the liquid in use.

10. An apparatus as claimed in claim 7, wherein the opening is closed off, wholly or in part, by the radial and circumferential walls and a deck from which the radial and circumferential walls depend, wherein the deck is substantially parallel to the surface of the liquid in use.

11. An apparatus as claimed in claim 1, wherein the ballast system further comprises a pump for pumping the liquid into the cells and/or for pumping water out of the cells.

12. An apparatus as claimed in claim 1 comprising one or more compressors for supplying air to the opening.

13. An apparatus as claimed in claim 1 comprising one or more sails mounted to the flywheel.

14. An apparatus as claimed in claim 13, wherein the sails extend around substantially the entire circumference of the flywheel.

15. An apparatus as claimed in claim 13, wherein the sails are rigid or flexible.

16. An apparatus as claimed in claim 13, wherein a control system is provided for altering the orientation of the sails with respect to a wind direction as the flywheel rotates.

17. An apparatus as claimed in claim 13, wherein the sails are mounted to masts, which are self-supporting or are supported by supports that extend between the masts, wherein the supports comprise rigging, and are arranged to allow the sails and rigging to lie flat.

18. An apparatus as claimed in claim 13, wherein two or more radially spaced circumferentially extending arrays of the sails are provided.

* * * * *